(12) United States Patent
Hoshino et al.

(10) Patent No.: US 8,923,724 B2
(45) Date of Patent: Dec. 30, 2014

(54) DRIVING DEVICE, CLEANING DEVICE, CHARGING DEVICE, ASSEMBLY, AND IMAGE FORMING APPARATUS

(71) Applicant: Fuji Xerox Co., Ltd., Tokyo (JP)

(72) Inventors: Hirohisa Hoshino, Kanagawa (JP); Ryota Kubo, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 33 days.

(21) Appl. No.: 13/758,451

(22) Filed: Feb. 4, 2013

(65) Prior Publication Data

US 2014/0086601 A1    Mar. 27, 2014

(30) Foreign Application Priority Data

Sep. 21, 2012   (JP) .................................. 2012-208867

(51) Int. Cl.
*G03G 15/02*   (2006.01)
*F16D 7/00*   (2006.01)

(52) U.S. Cl.
CPC ........ *G03G 15/0291* (2013.01); *G03G 15/0258* (2013.01); *F16D 7/00* (2013.01)
USPC .......................................... 399/100; 399/170

(58) Field of Classification Search
CPC ........................ G03G 15/0258; G03G 15/0291

USPC ................................................... 399/100, 170
See application file for complete search history.

(56) References Cited

U.S. PATENT DOCUMENTS

| | | | |
|---|---|---|---|
| 6,415,120 B1 * | 7/2002 | Tashiro et al. ................ | 399/100 |
| 2009/0245871 A1 * | 10/2009 | Maeda et al. ................ | 399/167 |
| 2011/0318046 A1 * | 12/2011 | Ichikawa et al. ............. | 399/100 |

FOREIGN PATENT DOCUMENTS

| | | |
|---|---|---|
| JP | 05-070819 B2 | 10/1993 |
| JP | 3363814 B2 | 1/2003 |
| JP | 4387169 B2 | 12/2009 |

* cited by examiner

*Primary Examiner* — Benjamin Schmitt

(74) *Attorney, Agent, or Firm* — Sughrue Mion, PLLC

(57) ABSTRACT

A driving device includes a drive source that generates a force for moving a cleaning member that cleans an elongated member while moving in a longitudinal direction of the elongated member; an overload limiter disposed between an input side and an output side of a transmission unit that transmits the force from the drive source to the cleaning member, the overload limiter interrupting transmission of the force if a magnitude of the force reaches a predetermined magnitude; and a rotation detector disposed in the transmission unit on an output side of the overload limiter, the rotation detector detecting rotation caused by the force.

12 Claims, 19 Drawing Sheets

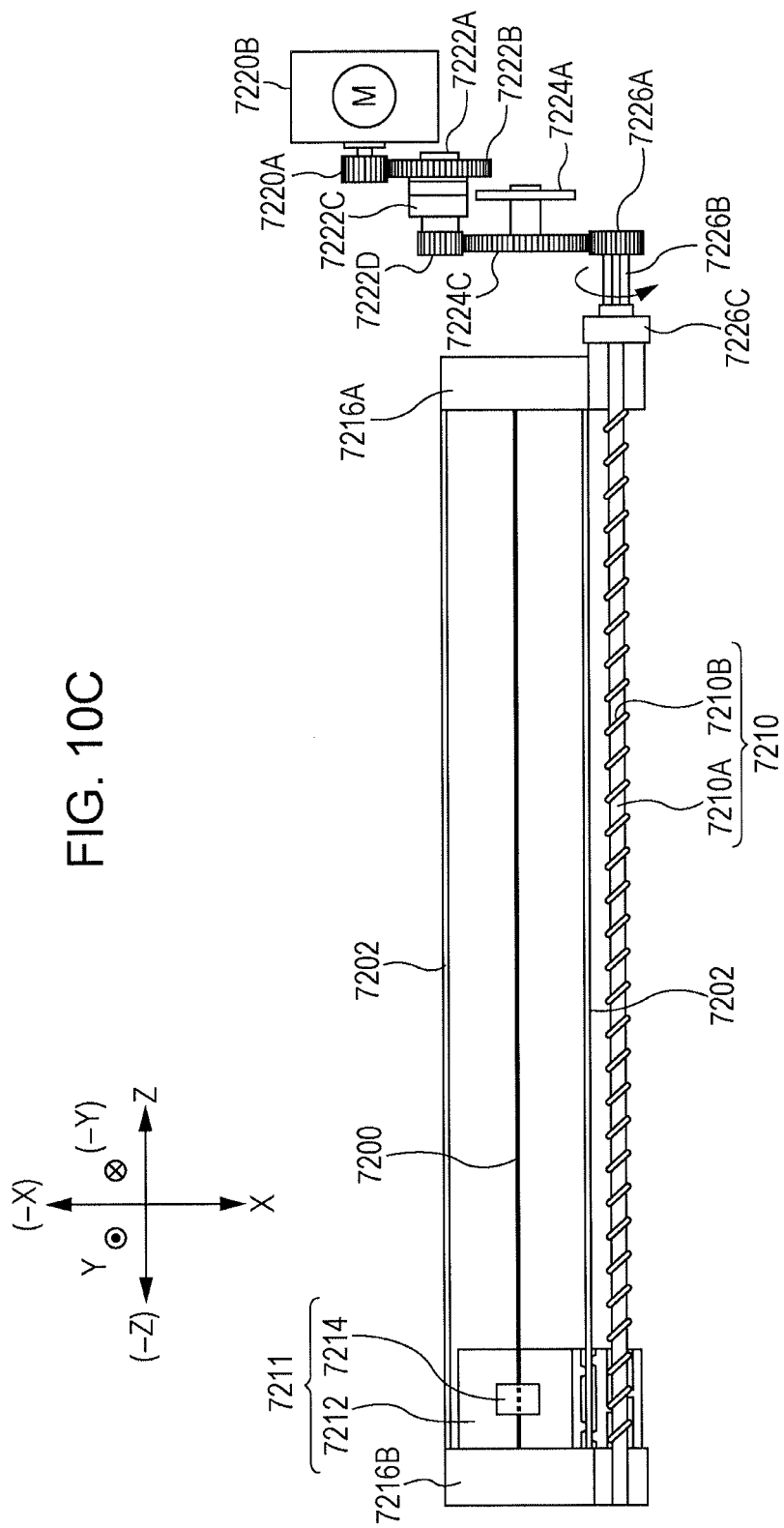

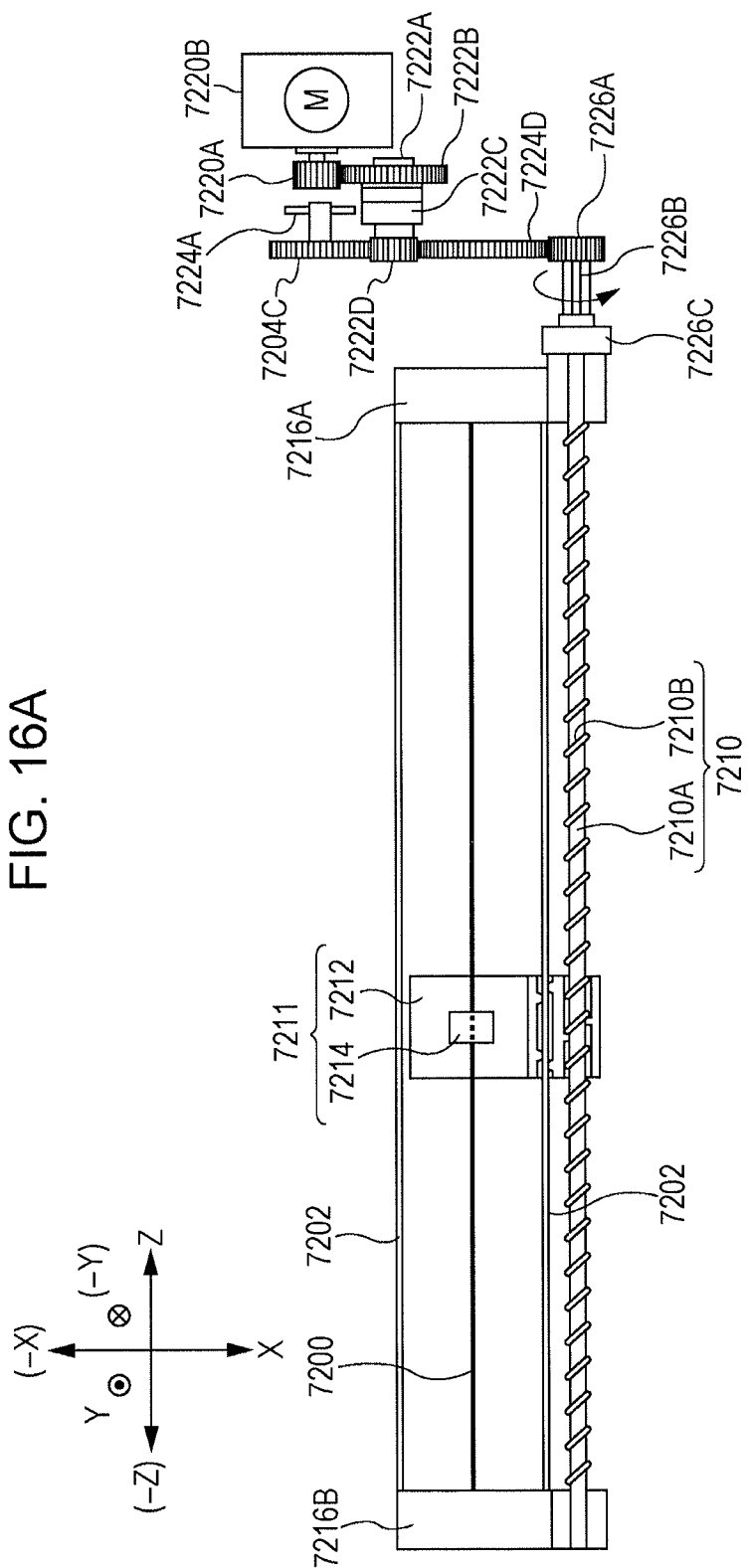

DRIVING DEVICE, CLEANING DEVICE, CHARGING DEVICE, ASSEMBLY, AND IMAGE FORMING APPARATUS

CROSS-REFERENCE TO RELATED APPLICATIONS

This application is based on and claims priority under 35 USC 119 from Japanese Patent Application No. 2012-208867 filed Sep. 21, 2012.

BACKGROUND

Technical Field

The present invention relates to a driving device, a cleaning device, a charging device, an assembly, and an image forming apparatus.

SUMMARY

According to an aspect of the invention, a driving device includes a drive source that generates a force for moving a cleaning member that cleans an elongated member while moving in a longitudinal direction of the elongated member; an overload limiter disposed between an input side and an output side of a transmission unit that transmits the force from the drive source to the cleaning member, the overload limiter interrupting transmission of the force if a magnitude of the force reaches a predetermined magnitude; and a rotation detector disposed in the transmission unit on an output side of the overload limiter, the rotation detector detecting rotation caused by the force.

BRIEF DESCRIPTION OF THE DRAWINGS

Exemplary embodiments of the present invention will be described in detail based on the following figures, wherein:

FIG. 10C is a schematic view illustrating the operation of the cleaning device of the charging device according to the exemplary embodiment of the present invention;

FIG. 16A is a schematic view of a charging device including a modification of the driving device according to the exemplary embodiment of the present invention.

DETAILED DESCRIPTION

First Exemplary Embodiment

Hereinafter, an exemplary embodiment of the present invention will be described with reference to the drawings. First, the overall structure and operation of an image forming apparatus will be described. Next, the structures and operations of a charging device, and a charging member, a cleaning member, and a driving device, which are included in the charging device will be described. Moreover, a display panel, which is an example of a notification unit, will be described.

Figure 1:
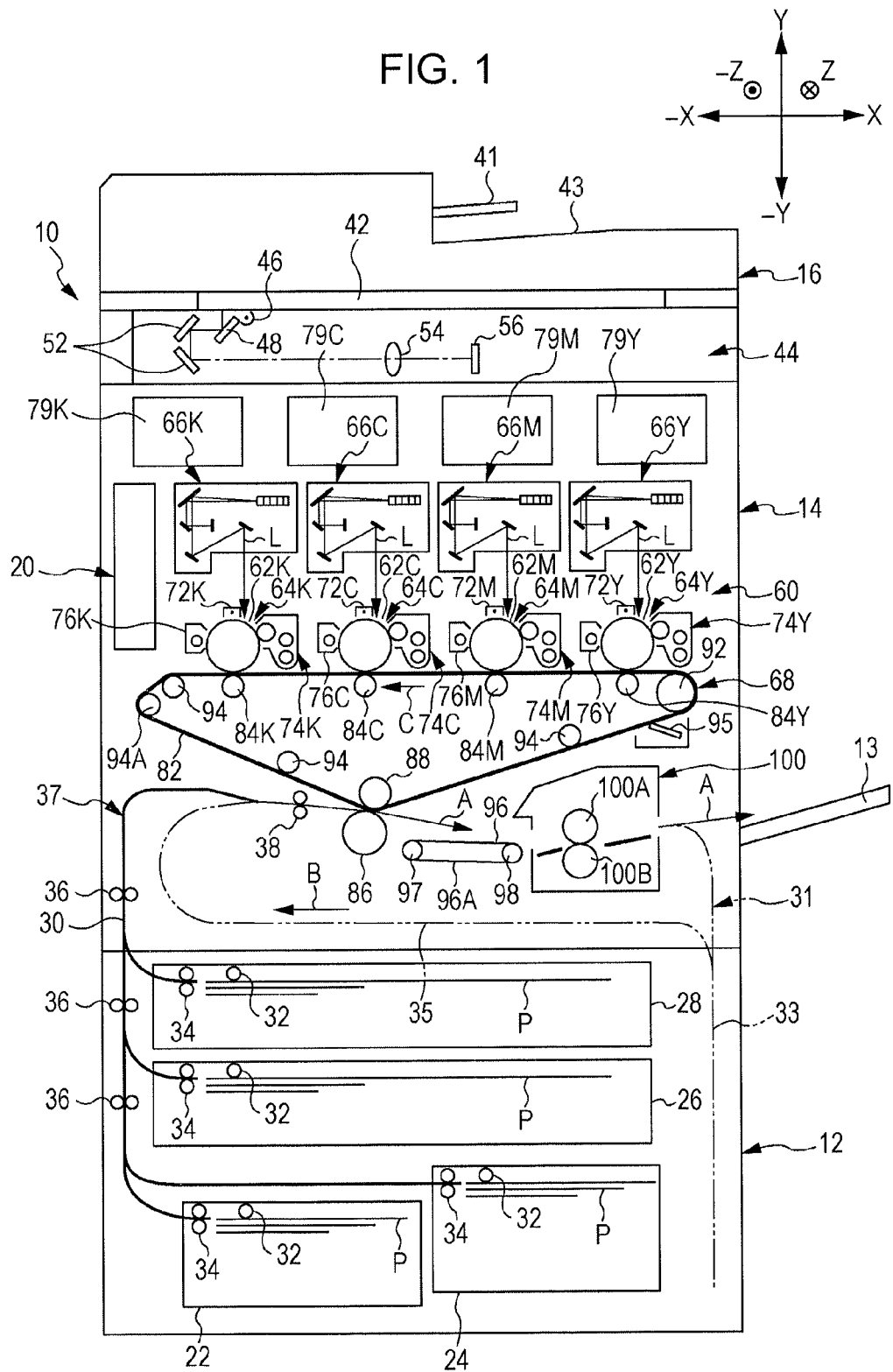
FIG. 1 is an overall schematic view of an image forming apparatus according to an exemplary embodiment of the present invention.

In the description below, the directions indicated by arrows Y and −Y in FIG. 1 will be referred to as the height direction and the directions indicated by arrows X and −X will be referred to as the width direction. Moreover, the directions indicated by the arrows Z and −Z will be referred to as the depth direction. The depth direction is perpendicular to the height direction and the width direction. In FIG. 1 and other figures, the symbol with "x" in "○" represents an arrow Z extending from the front side toward the back side of the sheet of the figure, and the symbol with "." in "○" represents an arrow −Z extending from the back side toward the front side of the sheet of the figure.

Overall Structure of Image Forming Apparatus

Overall Structure

FIG. 1 is a schematic front view illustrating the overall structure of an image forming apparatus 10 according to an exemplary embodiment of the present invention. The image forming apparatus 10 includes, from top to bottom in the height direction, a recording medium containing section 12, an image forming section 14, and an image reading section 16. The recording medium containing section 12 contains recording media P. The image forming section 14 forms an image on the recording medium P. The image reading section 16 reads an image of a document (not shown). The image forming section 14 includes a controller 20, which controls the components of the image forming apparatus 10. The controller 20 is an example of a determination unit, and the recording medium P is an example of a recording medium.

Recording Medium Containing Section

First, the recording medium containing section 12 will be described.

The recording medium containing section 12 includes a first container 22, a second container 24, a third container 26, and a fourth container 28 (hereinafter referred to as containers), which are capable of containing recording media P having different sizes. Each container includes a feed roller 32 and a transport roller 34. The feed roller 32 feeds the recording media P one by one. The transport roller 34 transports the recording media P to a transport path 30 in the image forming apparatus 10.

Transport Unit

Next, a transport unit 37, which is included in the recording medium containing section 12 and the image forming section 14 (described below), will be described.

The transport unit 37 is a transport mechanism through which the recording medium P, which has been transported from the feed roller 32 of each container, is transported through the second-transfer position and a fixing device 100 and is output to an output tray 13. The transport unit 37 includes the transport path 30 and a duplex transport path 31 described below, which includes a reversing portion 33 and a transport portion 35.

Three pairs of transport rollers 36, which transport the recording media P one by one, are disposed downstream of the transport rollers 34 of the containers along the transport path 30. One of the pairs of transport rollers 36 that are disposed at the most downstream position among the three pairs of transport rollers 36 in the transport direction of the recording medium P are disposed in the image forming section 14. Moreover, registration rollers 38 are disposed downstream of the transport rollers 36 in the transport direction of the recording medium P. The registration rollers 38 temporarily stop the recording medium P and feed the recording medium P to a second-transfer position described below at a predetermined timing, and thereby adjusts the position to which a toner image is transferred.

The fixing device 100 is disposed downstream of the second-transfer position in the transport path 30. The fixing device 100 fixes a toner image, which has been transferred to the recording medium P, to the recording medium P. The output tray 13 is disposed downstream of the fixing device 100. The recording medium P, to which the toner image has been fixed, is output to the output tray 13.

An auxiliary transport unit 96 is disposed between the second-transfer position and the fixing device 100. The auxiliary transport unit 96 transports the recording medium P, on which a toner image has been second-transferred, to the fixing device 100. The auxiliary transport unit 96 includes a transfer belt 96A, a support roller 97, and a driving roller 98. The transfer belt 96A transports the recording medium P. The support roller 97 supports the transfer belt 96A. The driving roller 98 is rotated by a driving unit (not shown) and rotates the transfer belt 96A so that the recording medium P is transported in the direction of arrow A.

The image forming apparatus 10 is capable of forming an image on both sides of the recording medium P. To be specific, the duplex transport path 31, along which the recording medium P is transported back and forth, is connected to the transport path 30. The duplex transport path 31 includes the reversing portion 33 and the transport portion 35. The reversing portion 33 extends linearly in the height direction from the image forming section 14 to the recording medium containing section 12. The trailing end of the recording medium P, which has been transported to the reversing portion 33, enters the transport portion 35, and the transport portion 35 transports the recording medium P in the direction of arrow B.

The downstream end of the transport portion 35 is connected to the transport path 30 through a guide member (not shown) at a position upstream of the registration rollers 38. The reversing portion 33 and the transport portion 35 each include plural transport rollers (not shown) that are arranged with predetermined intervals therebetween. A switching member performs switching between the transport path 30 and the duplex transport path 31 (not shown).

Image Forming Section

Next, the image forming section 14 will be described.

The image forming section 14 includes toner image forming units 64Y, 64M, 64C, and 64K; a transfer device 68; and the fixing device 100. The toner image forming units 64Y, 64M, 64C, and 64K respectively form yellow (Y), magenta (M), cyan (C), and black (K) toner images. The transfer device 68 first-transfers toner images formed by the toner image forming units 64Y, 64M, 64C, and 64K to an intermediate transfer belt 82, which is an example of an intermediate transfer medium, and then second-transfers the toner images from the intermediate transfer belt 82 to the recording medium P. The fixing device 100 fixes the toner images, which have been second-transferred to the recording medium P, to the recording medium P. Here, yellow (Y), magenta (M), cyan (C), and black (K) toners are each an example of a developer.

The characters Y, M, C, and K attached to the numerals respectively denote yellow (Y), magenta (M), cyan (C), and black (K). These characters will be omitted where it is not necessary to specify the colors.

Toner Image Forming Unit

Figure 2:
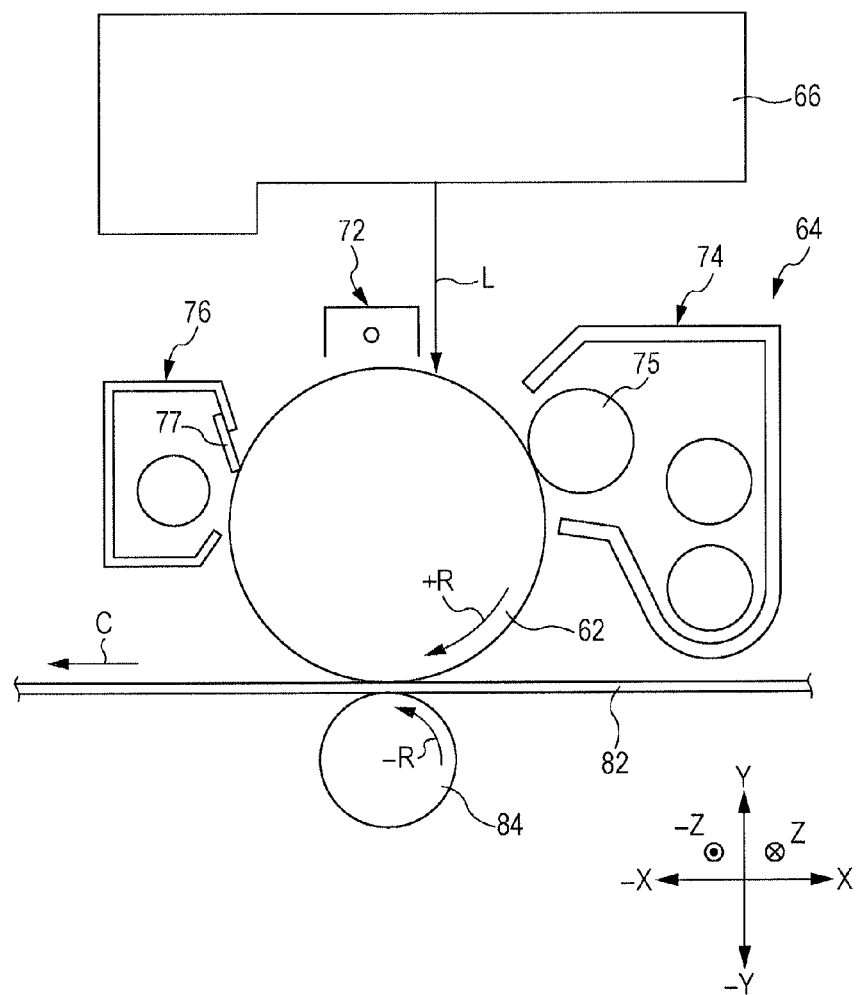
FIG. 2 is a schematic view of a toner image forming unit of an image forming unit according to the exemplary embodiment of the present invention.

The toner image forming units 64 will be described with reference to FIG. 2, which is a schematic front view of one of the toner image forming units 64. In FIG. 2, parts of the transfer device 68 (the intermediate transfer belt 82 and a first-transfer roller 84), which are not included in the toner image forming unit 64, are illustrated. All the toner image forming units 64 (for Y, M, C, and K) basically have the same structure.

The toner image forming unit 64 includes a photoconductor drum 62, a charging device 72, a latent image forming device (exposure device) 66, a developing device 74, and a removing device 76. The photoconductor drum 62 is rotated by a driving unit (not shown) in the direction of arrow +R. Elements of the toner image forming unit 64 will be described below. The photoconductor drum 62 is an example of an image carrier.

Photoconductor Drum

The photoconductor drum 62 has a cylindrical shape and is rotated by a driving unit (not shown) around its axis (in the direction of arrow +R). The photoconductor drum 62 includes an aluminium cylinder and a photosensitive layer. The photosensitive layer includes a base layer, a charge generation layer, and a charge transport layer, which are formed on the aluminum cylinder in this order.

The photoconductor drum 62 exhibits characteristics as an electrical insulator when the photoconductor drum 62 is charged by the charging device 72 and exhibits characteristics as a semiconductor when a light beam emitted by the latent image forming device 66 is incident on the photoconductor drum 62. The charging device 72 charges the surface of the photoconductor drum 62, and the latent image forming device 66 forms a latent image on the surface. An overcoating layer may be formed on the outer peripheral surface of the charge transport layer. The photoconductor drums 62 for Y, M, C, K are linearly arranged in the width direction as illustrated in FIG. 1 (in front view).

Charging Device

The charging device 72 negatively charges the outer peripheral surface (photosensitive layer) of the photoconductor drum 62. In the present exemplary embodiment, the charging device 72 is a scorotron charging device, which is a (non-contact) corona-discharging device. The charging device 72 will be described below in detail.

Latent Image Forming Device

The latent image forming device 66 forms an electrostatic latent image on the outer peripheral surface of the photoconductor drum 62, which has been charged by the charging device 72. To be specific, the latent image forming device 66 receives image data from an image signal processor (not shown) of the controller 20; modulates an exposure light beam L in accordance with the image data; and irradiates the outer peripheral surface of the photoconductor drum 62, which has been charged by the charging device 72, with the exposure light beam L. When the latent image forming device 66 irradiates the outer peripheral surface of the photoconductor drum 62 with the exposure light beam L, an electrostatic latent image is formed on the outer peripheral surface. In the present exemplary embodiment, the latent image forming device 66 irradiates the surface of the photoconductor drum 62, which rotates in the direction of arrow +R, with light that is emitted by a light source and scanned by a light scanning unit (optical system) including a polygon mirror and an Fθ lens, in the main scanning direction. In the present exemplary embodiment, latent image forming devices 66 are provided for respective colors. The main scanning direction includes the directions of arrows Z and −Z (see FIG. 4).

Developing Device and Toner Cartridge

The developing device 74 develops a toner image on the outer peripheral surface of the photoconductor drum 62 by developing the toner image using a toner of a corresponding color. The developing device 74 includes a toner container and a development roller 75. The toner container contains a toner. The development roller 75 rotates and supplies the toner to the photoconductor drum 62. One of toner cartridges 79 (see FIG. 1) for supplying the toner is connected to the toner container through a supply path (not shown). The toner cartridges 79, which contain toners of respective colors, are arranged in the width direction at positions above the photoconductor drum 62 and the latent image forming devices 66. The toner cartridges 79 are individually replaceable.

Removing Device

The removing device 76 includes a blade 77. The blade 77 removes toner, which remains on the surface of the photoconductor drum 62 after a toner image has been transferred to the transfer device 68, from the surface of the photoconductor drum 62. The removing device 76 includes a housing, which recovers toner that has been scraped off by the blade 77, and a transport unit, which transports the toner in the housing to the waster toner box.

Transfer Device

The transfer device 68 first-transfers the color toner images on the photoconductor drums 62 to the intermediate transfer belt 82 in an overlapping manner, and second-transfers the overlapping toner images to the recording medium P at the second-transfer position.

To be specific, the intermediate transfer belt 82 is an endless belt looped over plural rollers 88, 92, 94, and 94A. In the present exemplary embodiment, the intermediate transfer belt 82 has an inverted obtuse triangular shape elongated in the width direction in front view. The roller 92 functions as a driving roller that is driven by a motor (not shown) and that rotates the intermediate transfer belt 82 in the direction of arrow C. The roller 94A functions as a tension roller for applying a tension to the intermediate transfer belt 82. The roller 88 functions as a counter roller for a second-transfer roller 86.

An upper portion of the intermediate transfer belt 82, which extends in the width direction, is in contact with the photoconductor drums 62 for respective colors from below. Toner images on the photoconductor drums 62 are transferred to the intermediate transfer belt 82, because first-transfer voltages are applied to the toner images by the first-transfer rollers 84. The lower vertex of the intermediate transfer belt 82, at which an obtuse angle is formed, is in contact with the second-transfer roller 86 and forms a transfer nip. A power supply (not shown) applies a second-transfer voltage to the second-transfer roller 86, and the second-transfer roller 86 transfers the overlapping toner images to the recording medium P passing through the transfer nip. Here, the second-transfer position is a position at which the transfer nip is formed. Alternatively, the second-transfer roller 86 may be grounded to be at 0 (V), and the power supply (not shown) may apply the second-transfer voltage to the roller 88, and the roller 88 may transfer the overlapping toner images to the recording medium P passing through the transfer nip.

In a case of transferring only a toner image of a specific color (for example, only a black (K) toner image), only the black (K) toner image formed by the toner forming unit 64K is first-transferred to the intermediate transfer belt 82 and then second-transferred to the recording medium P.

Fixing Device

The fixing device 100 fixes the overlapping toner images, which have been second-transferred by the transfer device 68, to the recording medium P. In the present exemplary embodiment, the fixing device 100 presses and heats the toner images at a fixing nip, and thereby fixes the toner images to the recording medium P.

Image Reading Section

Overall Structure

Next, the image reading section 16 will be described.

The image reading section 16 includes a document tray 41, which is capable of holding documents (not shown) thereon, a platen glass 42 on which a single document is placed, a document reading device 44 that reads a document placed on the platen glass 42, and a document output tray 43 to which a document that has been read is output.

The document reading device 44 includes an irradiation unit 46, a full-rate mirror 48, a pair of half-rate mirrors 52, an imaging lens 54, and a photoelectric conversion element 56. The irradiation unit 46 irradiates a document placed on the platen glass 42 with light. The full-rate mirror 48 and the half-rate mirrors 52 reflect the light, with which the document has been irradiated and which has been reflected by the document, in a direction along the platen glass 42. The light reflected by the full-rate mirror 48 and the half-rate mirrors 52 is incident on the imaging lens 54. The imaging lens 54 focuses the light, and the photoelectric conversion element 56 converts the light into an electric signal.

The full-rate mirror 48 moves along the platen glass 42 at full rate, and the half-rate mirrors 52 move along the platen glass 42 at half rate.

An image signal processor (not shown) of the controller 20 performs image processing on the electric signal generated by the photoelectric conversion element 56, and the electric signal is used as image data by the latent image forming device 66.

Operation Panel (User Interface)

Figure 3:
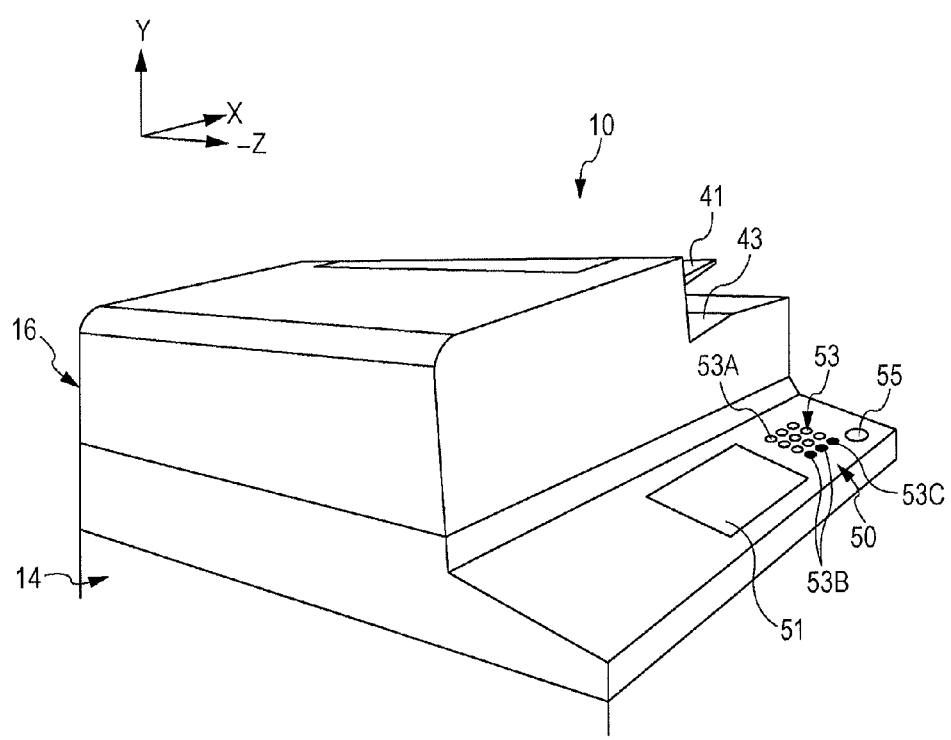
FIG. 3 is a perspective view of an image reading unit of the image forming apparatus according to the exemplary embodiment of the present invention.

Next, an operation panel 50 of the image reading section 16, which is an example of a user interface, will be described with reference to FIG. 3, which is a perspective view of the operation panel 50.

The operation panel 50 includes a display panel 51, an input keyboard 53, and a start button 55. The display panel 51 is an example of a notification unit. The input keyboard 53 includes plural keys and is disposed adjacent to the display panel 51. The start button 55 is used to start (perform) a document reading operation or an image formation operation.

The display panel 51 includes a display screen on which various information items are displayed. The display panel 51 includes a touchscreen panel that is capable of recognizing an item corresponding to a position at which the panel is pressed. Examples of the various information items include error information that irregular transporting of the recording medium P (paper jam) has occurred, information that there is no recording medium P in the container, information that there is no toner in the toner cartridges 79, and information that a cleaning member 7211 of the charging device 72 has abnormally stopped described below.

The input keyboard 53 includes numeric keys 53A for inputting numerical values (numerical amounts), a cursor key 53B for moving a cursor (not shown) displayed in the display panel 51, and a select key 53C for selecting an item to which the cursor is pointed.

All or part of the functions of the operation panel 50 may be performed by a computer that is connected to the image forming apparatus 10 through a communication network or the like.

Image Forming Operation

Next, an image formation operation with which the image forming apparatus 10 forms an image to the recording medium P will be described.

When receiving an image forming command, the controller 20 activates the toner image forming unit 64, the transfer device 68, and the fixing device 100. Thus, the photoconductor drum 62 and the development roller 75 are rotated, and the intermediate transfer belt 82 is rotated. A heating roller 100A and a pressing roller 100B, which are disposed in the fixing device 100, are rotated. Moreover, in sync with these operations, the controller 20 activates the transport rollers 36, the registration rollers 38, the auxiliary transport unit 96, and the like.

Thus, the photoconductor drums 62 for respective colors are charged by the charging devices 72 while being rotated. The controller 20 sends the image data, on which the image signal processor of the controller 20 has performed image processing, to the latent image forming devices 66. The latent image forming devices 66 emit exposure light beams L in accordance with image data and expose the charged photoconductor drums 62 with the exposure light beams L. Then, electrostatic latent images are formed on the outer peripheral surfaces of the photoconductor drums 62. The electrostatic latent images formed on the photoconductor drums 62 are developed using color toners supplied from the developing devices 74. Thus, color toner images are formed on the photoconductor drums 62 for the respective colors.

The color toner images formed on the photoconductor drums 62 are successively transferred to the rotating intermediate transfer belt 82 due to application of the first-transfer voltage by the first-transfer rollers 84. Thus, overlapping toner images of four colors are formed on the intermediate transfer belt 82. The overlapping toner images are transported to the second-transfer position as the intermediate transfer belt 82 rotates. The registration rollers 38 supply the recording medium P to the second-transfer position at a timing at which the overlapping toner images are transferred to the second-transfer position. Because the second-transfer voltage is applied at the second-transfer position, the overlapping toner images are transferred from the intermediate transfer belt 82 to the recording medium P.

The recording medium P, to which the overlapping toner images have been transferred, is transported by the rotating transfer belt 96A of the auxiliary transport unit 96 from the second-transfer position of the transfer device 68 to the fixing nip of the fixing device 100 (a nip between the heating roller 100A and the pressing roller 100B). The fixing device 100 applies pressure and heat (fixing energy) to the recording medium P passing through the fixing nip. Thus, the toner images transferred to the recording medium P is fixed to the recording medium P. The recording medium P output from the fixing device 100 is transported to the output tray 13, which is disposed outside of the image forming apparatus along the transport path 30, and the operation of forming an image on the recording medium P is finished.

Structure of Charging Device
Charging Device

Next, the charging device 72 according to the first exemplary embodiment, the charging member 720 and the cleaning device 721 of the charging device 72, and a driving device 722 of the cleaning device 721 will be described.

Charging Member

Figure 4:
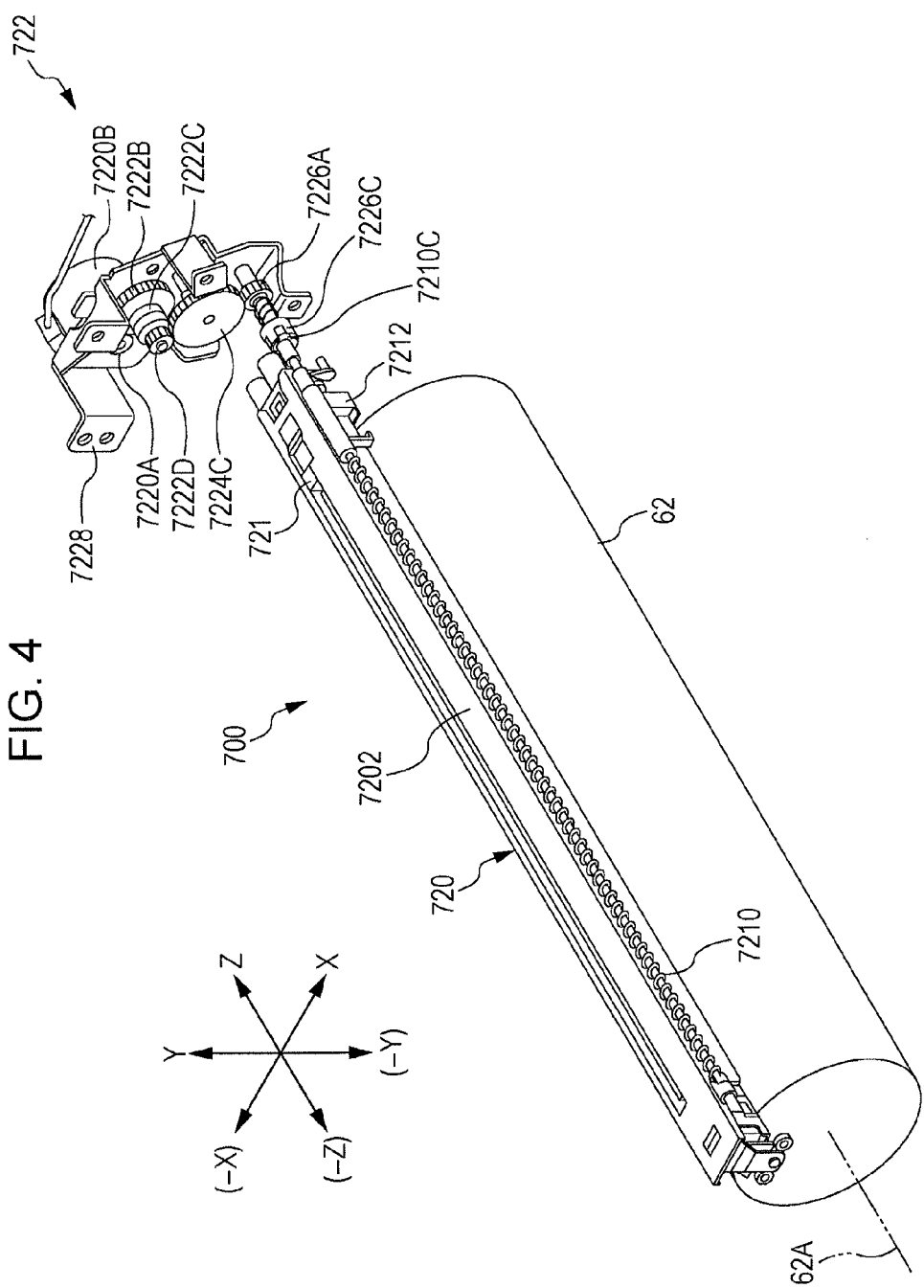
FIG. 4 is a perspective view of a charging device and an image carrier of the toner image forming unit according to the exemplary embodiment of the present invention.
Figure 5:
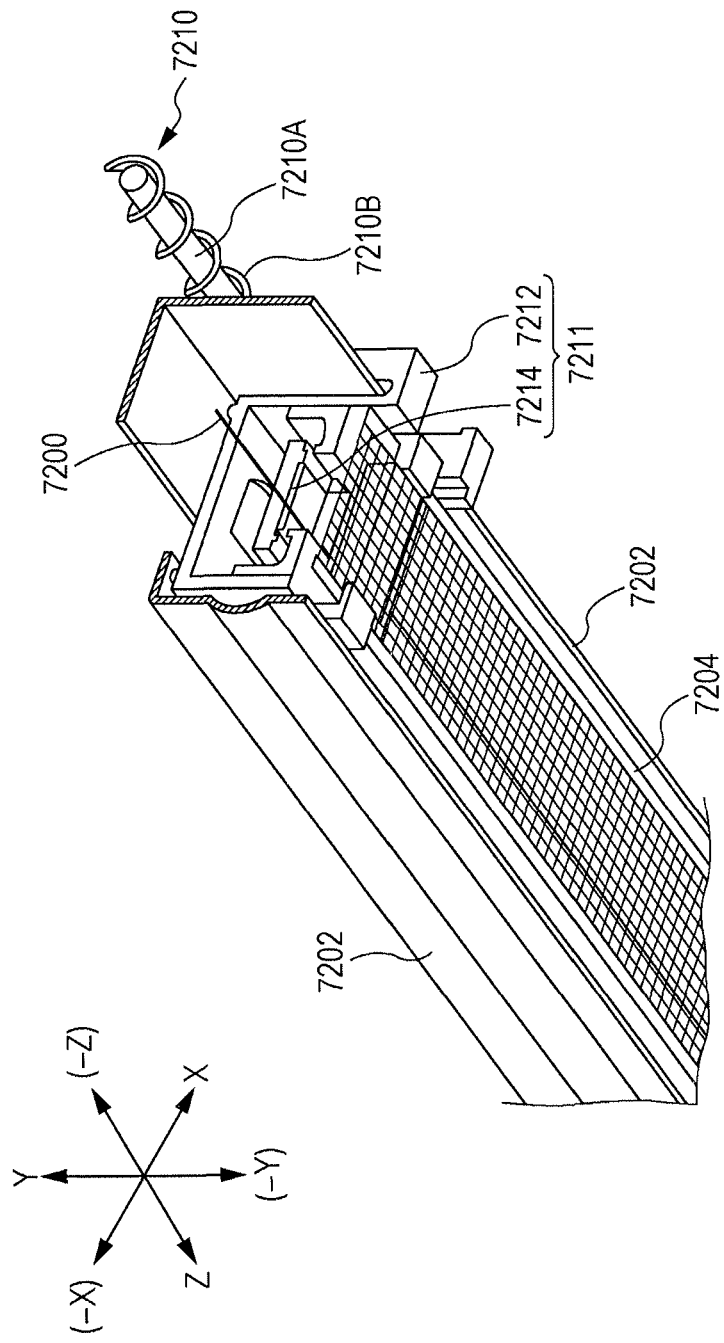
FIG. 5 is a partial perspective view of a charging member, a cleaning member, and a movement member of the charging device according to the exemplary embodiment of the present invention.

Referring to FIGS. 4 and 5, the charging member 720 will be described. FIG. 4 is a perspective view of the charging device 72 and the photoconductor drum 62 according to the exemplary embodiment of the present invention. FIG. 5 is a partial perspective view of the charging member 720 and the cleaning member 7211. In FIG. 4, a rotation axis 62A of the photoconductor drum 62 is shown by an alternate long and short dash line.

The charging member 720 includes a discharge wire 7200 (see FIG. 5), a housing 7202, and a grid 7204. The discharge wire 7200, which is an example of a discharge member, extends along the rotation axis 62A. The housing 7202 surrounds the discharge wire 7200 and has an opening that faces the photoconductor drum 62. The grid 7204 is disposed in the opening, has plural mesh openings, and controls the electric potential of the surface of the photoconductor drum 62. Side walls 7216A and 7216B are disposed at ends of the housing 7202. The side walls 7216A and 7216B are positioned relative to the housing 7202 and support corresponding ends of the discharge wire 7200. The charging member 720, the discharge wire 7200, the housing 7202, or the grid 7204, which is disposed along the rotation axis 62A of the photoconductor drum 62 (in the directions of arrows Z and −Z), is an example of an elongated member.

A power supply (not shown) supplies a predetermined negative voltage to each of the discharge wire 7200 and the grid 7204. To be specific, a negative voltage is applied to the discharge wire 7200, and a voltage determined in accordance with the surface potential of the photoconductor drum 62 is applied to the grid 7204. The housing 7202 is grounded to be at 0 (V). The base member of the photoconductor drum 62, which is an aluminium cylinder, is grounded to be at 0 (V), as with the housing 7202.

When the predetermined voltages are applied to the discharge wire 7200 and the grid 7204 and the housing 7202 is grounded to be at 0 (V), an electric field is formed between the discharge wire 7200 and the housing 7202, and thereby corona discharge occurs around the discharge wire 7200. An electric field is also formed between the discharge wire 7200 and the base member of the photoconductor drum 62.

As a result, negative ions generated by the corona discharge passes through the mesh openings of the grid 7204 and reach the surface of the photoconductor drum 62, and thereby the surface of the photoconductor drum 62 has a negative surface potential. Subsequently, when the potential difference between the grid 7204 and the photoconductor drum 62 decreases, negative ions cannot pass through the mesh openings of the grid 7204, and thereby the surface of the photoconductor drum 62 has a predetermined surface potential.

In order to charge the surface of the photoconductor drum 62, it is necessary that negative ions generated around the discharge wire 7200 pass through the mesh openings of the grid 7204. Therefore, the voltage applied to the grid 7204 is set higher than (closer to 0 (V) than) the voltage applied to the discharge wire 7200 and lower than (negatively larger than) the voltage (0 (V)) of the aluminium cylinder of the base member of the photoconductor drum 62.

The discharge wire 7200 is made of a metal, such as tungsten, because it is necessary to cause corona discharge between the discharge wire 7200 and the housing 7202. The discharge wire 7200 may be a metal wire whose surface is coated with a metal, such as gold, or any metal wire that functions as a discharge member. Instead of the discharge wire 7200, a discharge member having a saw-tooth shape may be used. The housing 7202 is made from a metal plate such as a stainless steel plate.

Cleaning Device

Referring to FIGS. 4 and 5, the cleaning device 721 will be described.

The cleaning device 721 includes a charging member cleaner 7214, a feed screw 7210, a cleaner holder 7212, and the driving device 722. The charging member cleaner 7214 cleans the surface of the discharge wire 7200 by moving in contact with the discharge wire 7200. The feed screw 7210 is attached to a side surface of the housing 7202 of the charging member 720, extends along the discharge wire 7200, and is rotatable around its axis. The cleaner holder 7212 is attached to the feed screw 7210 and the housing 7202, moves along the discharge wire 7200 as the feed screw 7210 rotates, and carries the charging member cleaner 7214. The driving device 722 generates a driving force for rotating the feed screw 7210.

The feed screw 7210 is an example of a movement member. In the present specification, the charging member cleaner 7214 and the cleaner holder 7212, which move along the discharge wire 7200 when the feed screw 7210 rotates around its axis, constitute the cleaning member 7211.

The charging member cleaner 7214 may clean the housing 7202 or the grid 7204 by moving in contact with the housing 7202 or the grid 7204. The charging member cleaner 7214 may clean at least one of the discharge wire 7200, the housing 7202, and the grid 7204 by moving in contact with these members.

The feed screw 7210 includes a rotary shaft 7210A, a thread 7210B, and a coupling connector 7210C. The rotary shaft 7210A extends in the longitudinal direction (directions of arrows Z and −Z) of the housing 7202. The thread 7210B is helically formed around the outer periphery of the rotary shaft 7210A. The coupling connector 7210C is connected to a coupling 7226C of the driving device 722 described below, and a torque generated by the driving device 722 is directly transmitted to the coupling connector 7210C. The feed screw 7210 is made by welding a metal wire to the peripheral surface of the rotary shaft 7210A while helically winding the metal wire around the peripheral surface. The thread 7210B has a helical shape having a regular pitch along the rotary shaft 7210A.

When the feed screw 7210 rotates clockwise around its axis, the cleaning member 7211 moves in the −Z direction along the discharge wire 7200. When the feed screw 7210 rotates counterclockwise around its axis, the cleaning member 7211 moves in the Z direction. Alternatively, the cleaning member 7211 may move in the Z direction when the feed screw 7210 rotates clockwise and may move in the −Z direction when the feed screw 7210 rotates counterclockwise.

When the cleaning member 7211 moves along the discharge wire 7200 (in the directions of arrows Z and −Z), the cleaning member 7211 removes foreign substances adhering to the surface of the discharge wire 7200, the housing 7202, or the grid 7204.

Driving Device

Figure 6:
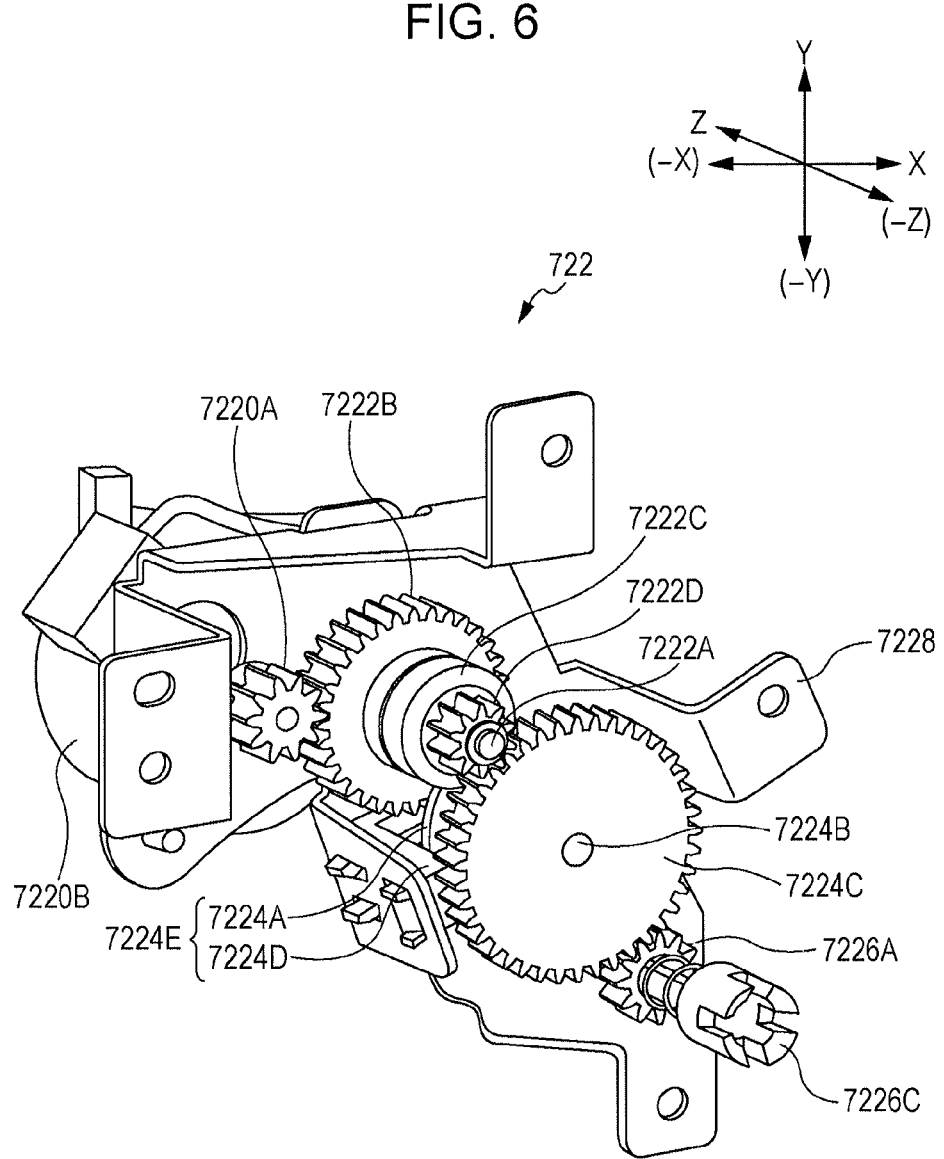
FIG. 6 is a perspective view of a driving device of the charging device according to the exemplary embodiment of the present invention.
Figure 7:
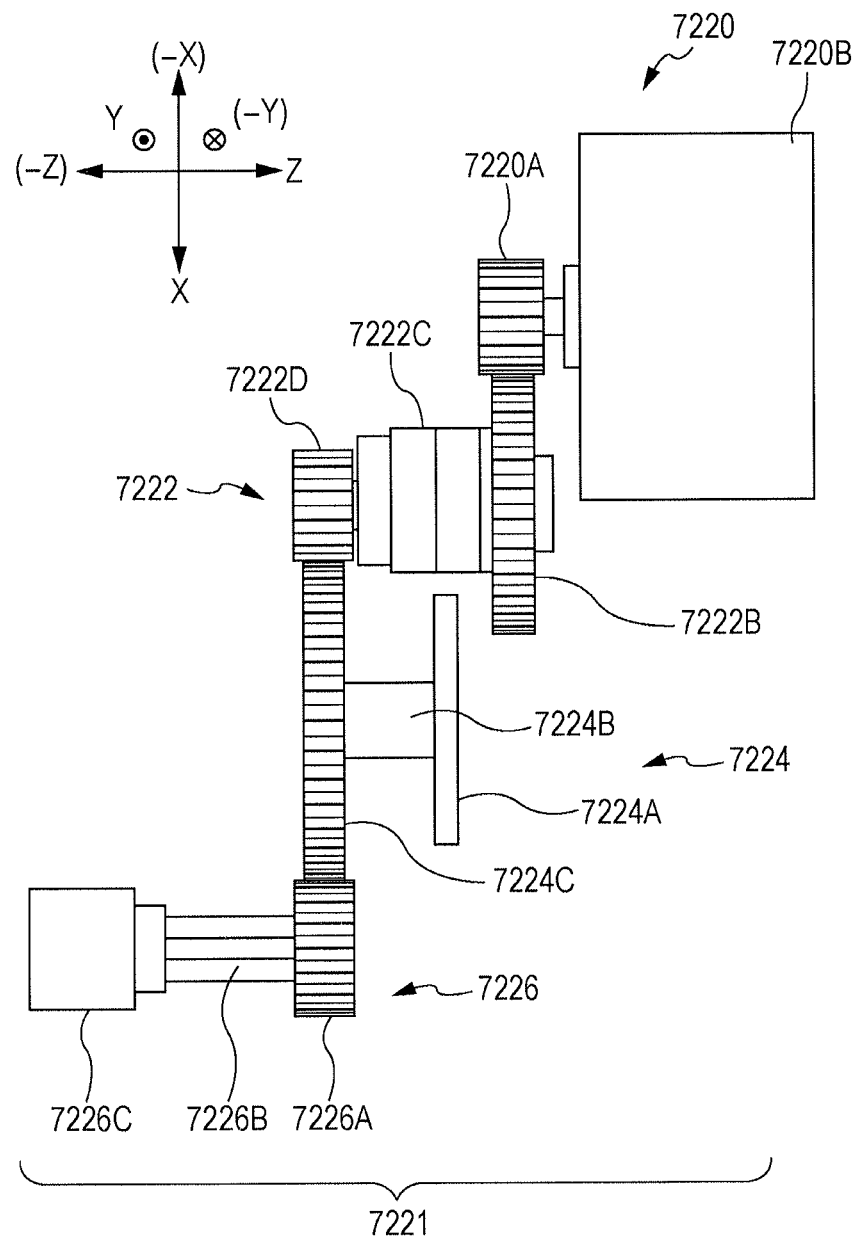
FIG. 7 is a schematic view of a gear train of the driving device according to the exemplary embodiment of the present invention.
Figure 8:
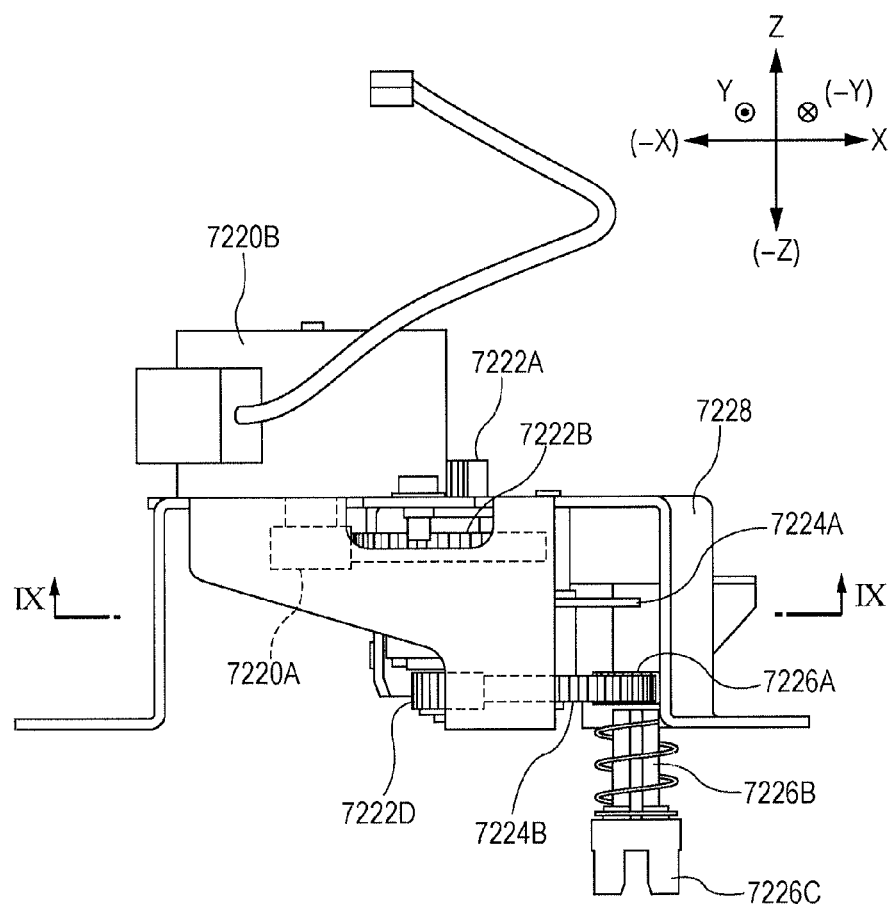
FIG. 8 is a plan view of the driving device of the charging device according to the exemplary embodiment of the present invention.
Figure 9:
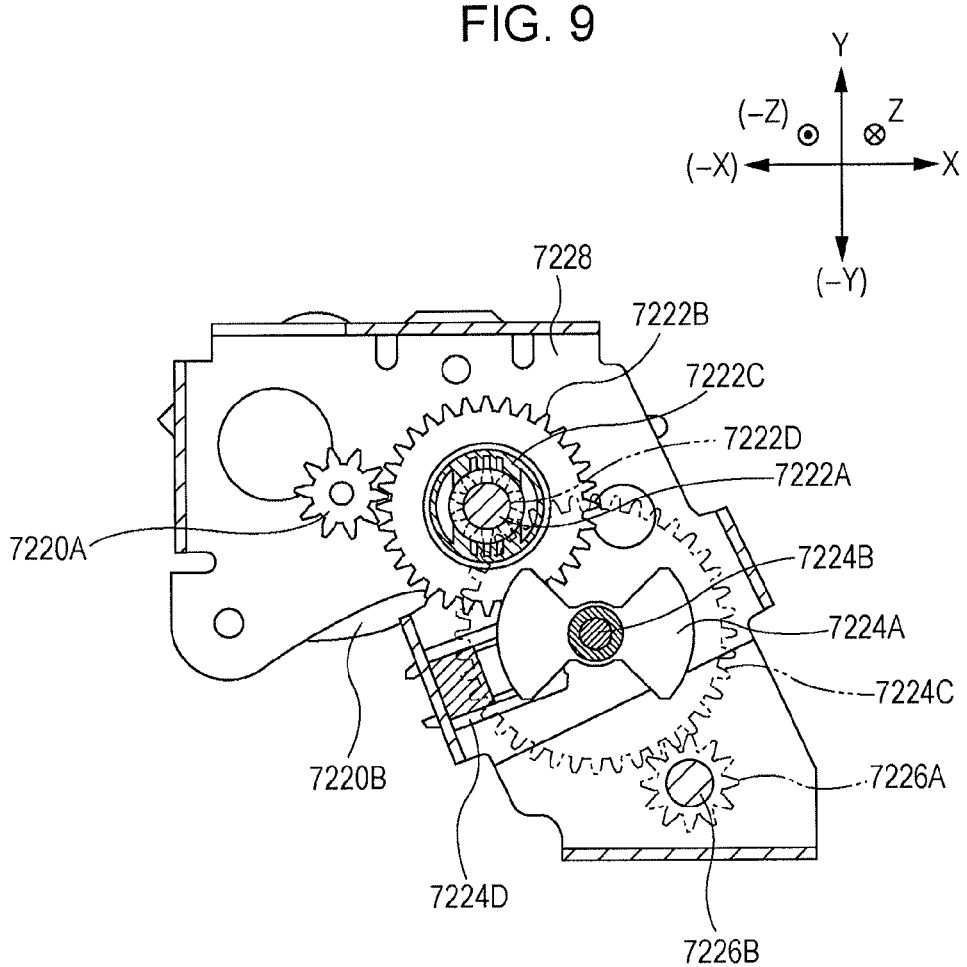
FIG. 9 is a sectional view of the driving device of the charging device according to the exemplary embodiment of the present invention, taken along line IX-IX of FIG. 8.

Referring to FIGS. 6 to 9, the driving device 722, which is an example of a driving device, will be described. FIG. 6 is a perspective view of the driving device 722. FIG. 7 is a schematic view of a gear train of the driving device 722 seen from above in the height direction (in the −Y direction). FIG. 7 illustrates a transmission path, in particular, the gear train, through which a torque generated by a motor 7220B described below is transmitted to the coupling 7226C. FIG. 8 is a plan view of the driving device 722. FIG. 9 is a sectional view taken along line IX-IX of FIG. 8. Referring to FIG. 7 and other figures, the driving device 722 will be described below.

The driving device 722 includes a driving unit 7220, a first transmission unit 7222, a second transmission unit 7224, and a third transmission unit 7226.

The driving unit 7220 includes the motor 7220B and a first gear 7220A. The motor 7220B generates a torque. The first gear 7220A is directly attached to a rotary shaft of the motor 7220B and rotated by the torque. The motor 7220B is an example of a drive source. The torque generates a force for moving the cleaning member 7211.

The first transmission unit 7222 includes an idler shaft 7222A, and a second gear 7222B and a third gear 7222D that are arranged on the idler shaft 7222A. The second gear 7222B is rotated in mesh with the first gear 7220A of the driving unit 7220. The third gear 7222D is rotated by the torque described above. The first transmission unit 7222 further includes a torque limiter 7222C, which is disposed on the idler shaft 7222A between the second gear 7222B and the third gear 7222D. The torque limiter 7222C interrupts transmission of a torque from the second gear 7222B to the third gear 7222D when the magnitude of the torque reaches a predetermined magnitude. The torque limiter 7222C is an example of an overload limiter.

The second transmission unit 7224 includes a fourth gear 7224C and a second rotary shaft 7224B. The fourth gear 7224C rotates in mesh with the third gear 7222D of the first transmission unit 7222. The fourth gear 7224C is attached to one end of the second rotary shaft 7224B, and the second rotary shaft 7224B rotates as the fourth gear 7224C rotates. The second transmission unit 7224 further includes a rotation member 7224A at the other end of the second rotary shaft 7224B, and the rotation member 7224A rotates as the second rotary shaft 7224B rotates.

As illustrated in FIG. 9, the rotation member 7224A includes two blades and rotates around the second rotary shaft 7224B. The central angle of each of the blades and spaces between the blades around the axis of the second rotary shaft 7224B is 90°, and the blades and the spaces are alternately arranged in the rotation direction.

A photosensor 7224D for detecting the presence/absence of the blades by using light is disposed on both sides of the blades of the rotation member 7224A in the axial direction of the second rotary shaft 7224B. The photosensor 7224D include a light emitter and a light detector that are disposed with the blades therebetween. A rotation detector 7224E, which includes the rotation member 7224A and the photosensor 7224D, is an example of a rotation detector.

Here, light emitted from the light emitter is not detected by the light detector when the light is blocked by a blade of the rotation member 7224A. The light is detected by the light detector when the light is not blocked by a blade of the rotation member 7224A. Because the rotation member 7224A rotates at a predetermined number of rotations (at a predetermined angular velocity), light detected by the light detector and converted into an electric signal is detected as ON/OFF pulse signals.

The precision of the rotation detector 7224E may be increased by increasing the number of blades of the rotation member 7224A. In FIG. 9, the central angle of each of the blades and spaces between the blades is 90°. Alternatively, for example, by using four blades each having a central angle of 45° and making the central angle of each of spaces between the blades be 45°, the detection precision becomes twice that of the detector shown in FIG. 9.

The third transmission unit 7226 includes a fifth gear 7226A and a third rotary shaft 7226B. The fifth gear 7226A is rotated in mesh with the fourth gear 7224C of the second transmission unit 7224. The fifth gear 7226A is attached to one end of the third rotary shaft 7226B, and the third rotary shaft 7226B rotates as the fifth gear 7226A rotates. The third transmission unit 7226 further includes a coupling 7226C attached to the other end of the third rotary shaft 7226B. The coupling 7226C is removably connected to the coupling connector 7210C of the feed screw 7210.

Here, the first transmission unit 7222, the second transmission unit 7224, and the third transmission unit 7226, which transmits a torque generated by the motor 7220B to the feed screw 7210, constitute a transmission unit 7221. To be specific, the transmission unit 7221 is a transmission path along which a torque generated by the motor 7220B is transmitted from the first gear 7220A to the coupling 7226C.

In the example illustrated in FIG. 9, a transmissive photosensor is used as the rotation detector 7224E. Alternatively, any sensor that is capable of detecting rotation, such as a reflective photosensor or a magnetic sensor, may be used.

The torque limiter 7222C is disposed between the input side (the first gear 7220A side) and the output side (the coupling 7226C side) of the transmission unit 7221 with respect to the direction in which a torque generated by the motor 7220B is transmitted. The rotation detector 7224E is disposed on the output side of the torque limiter 7222C. The coupling 7226C is disposed at the end of the transmission unit 7221 on the output side.

Process Cartridge

Figure 15:
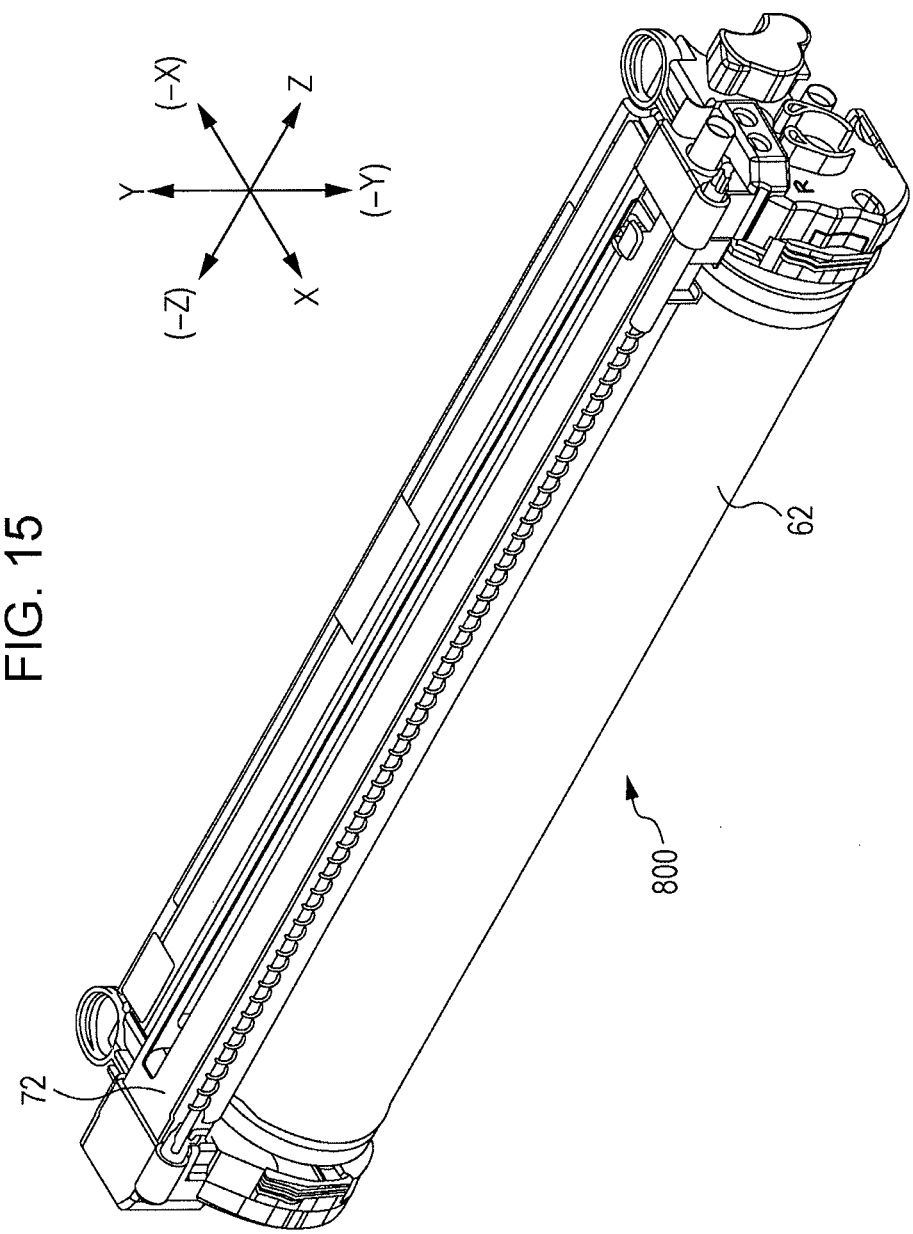
FIG. 15 is a perspective view of an assembly according to the exemplary embodiment of the present invention.

Heretofore, the charging device 72 and other elements (components) of the toner image forming unit 64 have been individually described. Two or more of these elements may be assembled together and integrated into a process cartridge that is removable from the image forming apparatus 10. For example, the photoconductor drum 62 and an assembly 700 (see FIG. 4) including the charging member 720, the cleaning member 7211, and the feed screw 7210 may be integrated into a process cartridge 800 (see FIG. 15). The assembly 700 is an example of an assembly, and the process cartridge is another example of an assembly.

Operation (Effect) of Charging Device

Figure 10A:
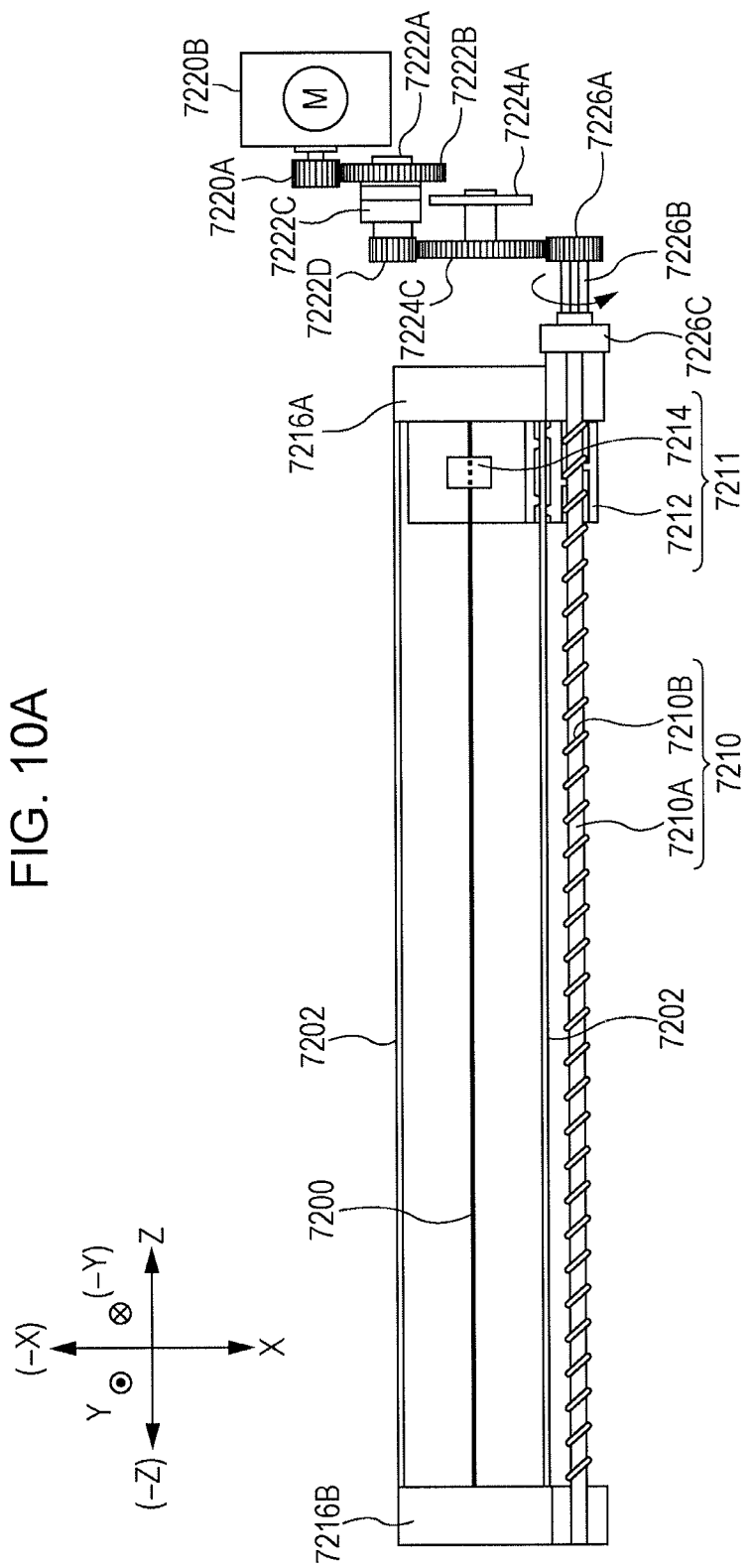
FIG. 10A is a schematic view illustrating an operation of the cleaning device of the charging device according to the exemplary embodiment of the present invention.
Figure 10B:
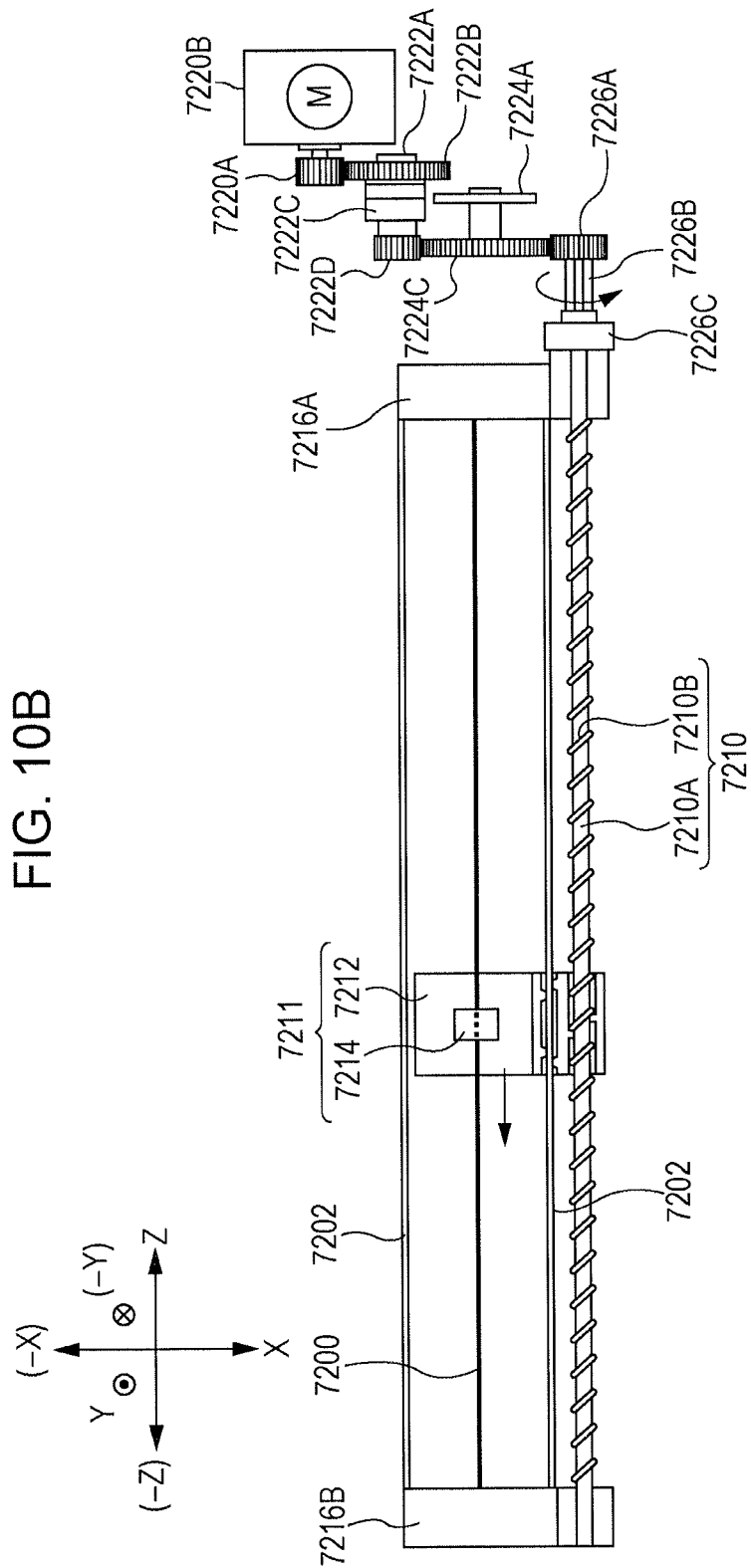
FIG. 10B is a schematic view illustrating the operation of the cleaning device of the charging device according to the exemplary embodiment of the present invention.
Figure 12:
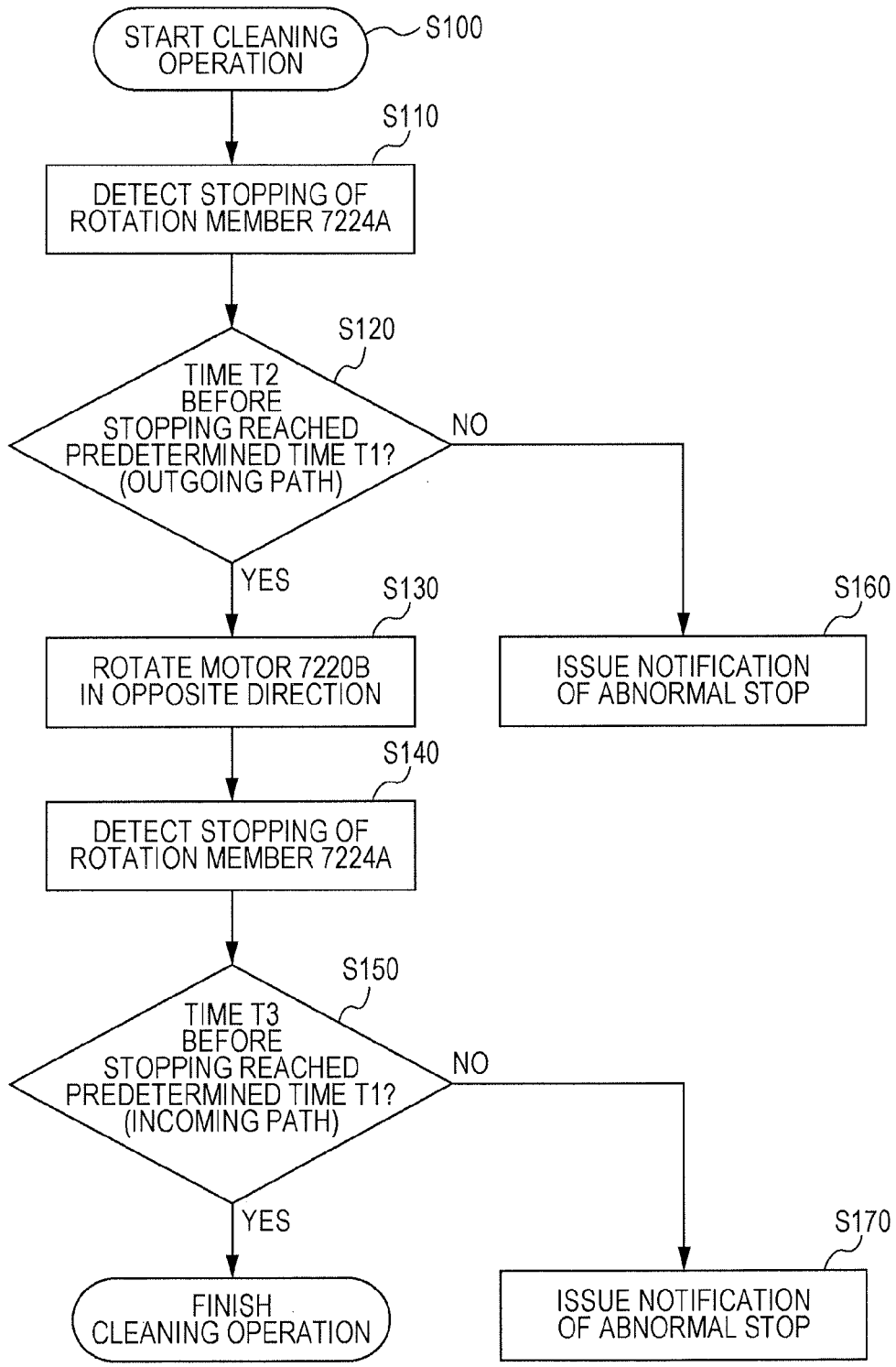
FIG. 12 is a flowchart of a first cleaning operation performed by the cleaning device according to the exemplary embodiment of the present invention.

Referring to FIGS. 10A to 10C, operations (effects) of the charging device 72, the cleaning device 721, and the driving device 722 will be described. FIGS. 10A to 10C are schematic views illustrating a cleaning operation performed by the cleaning device 721 of the charging device 72 seen from above in the height direction. FIG. 12, which is a flowchart of a first cleaning operation, will be also used in the following description.

In the cleaning operation, the cleaning member 7211 of the charging device 72 starts moving from a standby position described below, moves in the direction of arrow −Z along the discharge wire 7200, reverses direction at a reversing position described below, and returns to the standby position.

Standby

The cleaning member 7211 is located at a standby position illustrated in FIG. 10A when the cleaning operation is not performed. To be specific, when the cleaning member 7211 is located at the standby position, a side surface of the cleaning member 7211 of the cleaner holder 7212 facing in the direction of arrow Z is in contact with the side wall 7216A. The standby position is located outward from an image forming region in the direction of arrow Z along the axis of the photoconductor drum 62 (toward the driving device 722).

Cleaning (Movement)

When cleaning conditions are satisfied, in step S100 (shown in FIG. 12), the controller 20 sends a command to start a cleaning operation to the driving device 722 of the cleaning device 721. Subsequently, the motor 7220B is driven and rotates the first gear 7220A. As the first gear 7220A rotates, the entirety of the transmission unit 7221 is driven, and the coupling 7226C on the output side is rotated.

Accordingly, a torque generated by the motor 7220B is transmitted to the coupling connector 7210C, which has been in mesh with the coupling 7226C and has been stopped. The feed screw 7210, which is connected to the coupling connector 7210C, is rotated around its axis in the direction of arrows in FIGS. 10A to 10C (hereinafter referred to as a forward direction). Then, as illustrated in FIG. 10B, the cleaning member 7211 moves in the direction of arrow −Z along the discharge wire 7200. During the cleaning operation, the motor 7220B rotates at a predetermined rotation speed.

The photosensor 7224D of the rotation detector 7224E, which is disposed in the transmission unit 7221, detects rotation and stopping of the rotation member 7224A by emitting and receiving light and sends the detection result to the controller 20.

In the foregoing description, the cleaning operation is performed when the cleaning conditions are satisfied. Alternatively, the cleaning operation may be performed according to other criteria, such as at predetermined intervals, frequency of use, and the timing at which the image forming apparatus 10 is switched on.

Reversing

When the cleaning member 7211 moves further from the position shown in FIG. 10B, a side surface of the cleaning member 7211 facing in the direction of arrow −Z collides with the side wall 7216B. As illustrated in FIG. 10C, the cleaning member 7211 is not allowed to move further (in the −Z direction from the side wall 7216B). This position, at which the side surface of the cleaning member 7211 facing in the direction of arrow −Z contacts the side wall 7216B and the cleaning member 7211 is not allowed to move in the direction of arrow −Z, will be referred to as a "reversing position".

Due to the contact, the cleaning member 7211 receives resistance that is larger than frictional resistance that the cleaning member 7211 receives from the discharge wire 7200 and the like. Accordingly, to rotate the feed screw 7210, it is necessary to apply a torque larger than that for performing ordinary cleaning. The motor 7220B is designed so as to be capable of generating such a torque. When the cleaning member 7211 stops at the reversing position and the magnitude of the torque applied to the feed screw 7210 reaches a predetermined magnitude, the torque limiter 7222C limits transmission of the torque to the output side thereof and interrupts the rotation.

Then, the torque transmitted to the coupling connector 7210C, which is connected to the output side of the transmission unit 7221, is limited, and thereby rotation to the feed screw 7210 is stopped. As a result, the cleaning member 7211 is stopped at the reversing position and does not move further in the −Z direction.

As the rotation of the output side of the torque limiter 7222C is stopped, rotation of the rotation member 7224A is stopped. In step S110, the photosensor 7224D detects stopping of the rotation of the rotation member 7224A. When receiving the detection result, the controller 20 recognizes that the cleaning member 7211 has stopped for some reason.

A predetermined time T1 (sec), which is the time required by the cleaning member 7211 to move from the standby position to the reversing position without fault, is stored beforehand in a first storage unit (read only memory (ROM), not shown) of the controller 20. A time T2 (sec), which is the time during which the rotation member 7224A has been normally rotating (at a predetermined speed), is stored in a second storage unit (read only memory (ROM), not shown) of the controller 20.

Subsequently, in step S120, the controller 20 determines whether or not T2 (sec) stored in the second storage unit has reached T1 (sec). If it is determined that the time T2 has reached the time T1, the controller 20 recognizes that the cleaning member 7211 has stopped at the reversing position. In step S130, the controller 20 sends a command to rotate the motor 7220B in the opposite direction to the driving device 722. When the motor 7220B rotates in the opposite direction, the feed screw 7210 is rotated in the opposite direction, and the cleaning member 7211, which has been stopped at the reversing position, starts moving in the opposite direction (toward the standby position).

When the motor 7220B starts rotating in the opposite direction, the rotation member 7224A also starts rotating in the opposite direction. The photosensor 7224D sends a detection result to the controller 20.

Finishing

When the cleaning member 7211 moves further in the direction of arrow Z, the cleaning member 7211 reaches the standby position and collides with the side wall 7216A. The cleaning member 7211 is not allowed to move further (in the Z direction from the side wall 7216A). As in the case of the reversing position described above, the torque limiter 7222C interrupts rotation when the collision occurs, and thereby the rotation of the rotation member 7224A is stopped. In step S140, the photosensor 7224D detects stopping of the rotation of the rotation member 7224A. When receiving the detection result, the controller 20 recognizes that the rotation of the rotation member 7224A has stopped for some reason. A time T3 (sec), which is the time required by the cleaning member 7211 to move from the reversing position to the standby position, is stored in the second storage unit.

Subsequently, in step S150, the controller 20 determines whether or not T3 (sec) has reached T1 (sec). If it is determined that T3 has reached T1, the controller 20 recognizes that the cleaning member 7211 has stopped at the standby position (the cleaning operation has been performed normally), and finishes the cleaning operation.

In the foregoing description, in the cleaning operation, the cleaning member 7211 starts moving from the standby position, reverses direction at the reversing position, and returns to the standby position. Alternatively, the cleaning member 7211 may move along one of an outgoing path from the standby position to the reversing position and an incoming path from the reversing position to the standby position, and the standby position and the reversing position may be interchanged with each other every time a cleaning operation is performed.

Abnormal Stop

Figure 11:
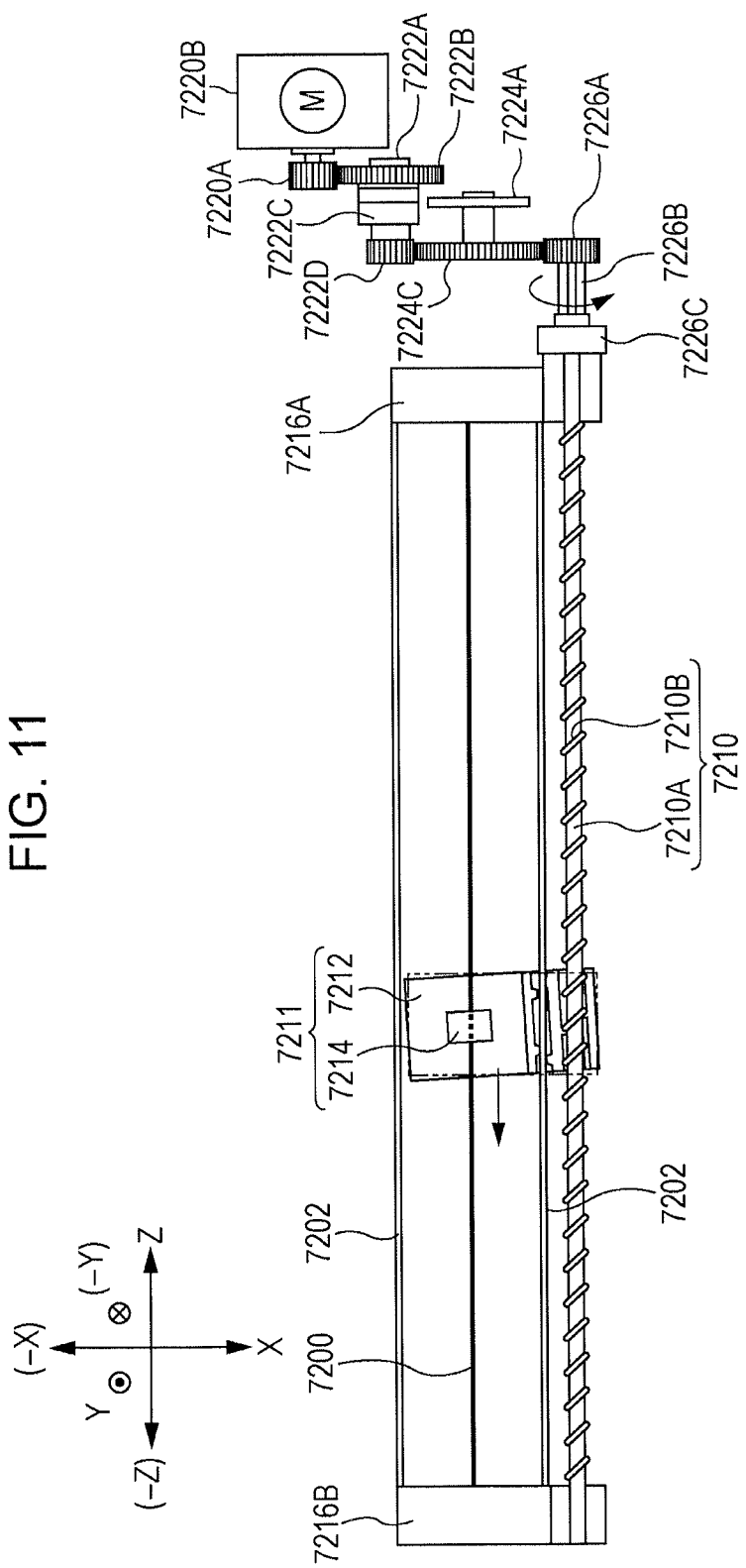
FIG. 11 is a schematic view illustrating the charging device according to the exemplary embodiment of the present invention when the cleaning member is abnormally stopped.

Referring to FIG. 11, a case where the cleaning member 7211 stops (abnormally stops) at a position other than the reversing position or the standby position during a cleaning operation will be described. An abnormal stop may occur if the cleaning member 7211 becomes inclined with respect to the movement direction during a cleaning operation or if the cleaning member 7211 receives large frictional resistance due to foreign substances such as toner adhering to the discharge wire 7200, the feed screw 7210, and the like.

An operation of the cleaning device 721 performed when the abnormal stop occurs will be described with reference to FIG. 12, which is a flowchart of the operation.

In step S120 or S150, the controller 20 determines whether or not T2 (sec) or T3 (sec), which is stored in the second storage unit, has reached T1 (sec). If it is determined that the time T2 or the time T3 has not reached the time T1, the controller 20 recognizes that the cleaning member 7211 has abnormally stopped. Then, in step S160 or S170, the controller 20 issues notification that the cleaning member 7211 has abnormally stopped by using the display panel 51 (see FIG. 3), which is disposed on the image reading section 16.

Instead of using the display panel 51, the notification may be displayed on a display unit (monitor) of a computer that is connected to the image forming apparatus 10 through a network. The notification may be made by using a sound instead of a display.

Other Effects

The charging device 72 is connectable to the coupling 7226C, which is disposed on the output side of the transmission unit 7221 of the driving device 722, through the coupling connector 7210C, which is disposed at an end of the feed screw 7210. The charging device 72 may be separated from the coupling 7226C by pulling the charging device 72 in the axial direction. To be specific, the charging device 72 may be separated into the driving device 722 and the assembly 700 (see FIG. 4), which includes the charging member 720, the cleaning member 7211, and the feed screw 7210. The driving device 722 is integrated into the image forming apparatus 10. Therefore, it is not necessary that the assembly 700 include a mechanism for directly detecting the cleaning member 7211, and therefore increase in the size of the assembly 700 is restrained.

It is not necessary to replace the entirety of the charging device 72, and the assembly 700, which is a part of the charging device 72, may be removed from the image forming apparatus 10. Therefore, the assembly 700 as a consumable component is made less expensive.

It is not necessary to dispose a mechanism for detecting the cleaning member 7211 in a movement range of the cleaning member 7211. Therefore, increase in the size of the image forming apparatus 10 is also restrained.

A mechanism for detecting whether or not the cleaning member 7211 is present at the standby position and detecting the position at which the cleaning member 7211 is located is included in the driving device 722, which is disposed on the back side of the assembly (facing in the Z direction). That is, the driving device 722 has a function of driving the cleaning member 7211 and a function of detecting the position of the cleaning member 721.

Therefore, increase in the size of the process cartridge 800 (see FIG. 15), into which the assembly 700 and the photoconductor drum 62 are integrated so as to be removable from the image forming apparatus 10, is restrained.

Second Exemplary Embodiment

Figure 13:
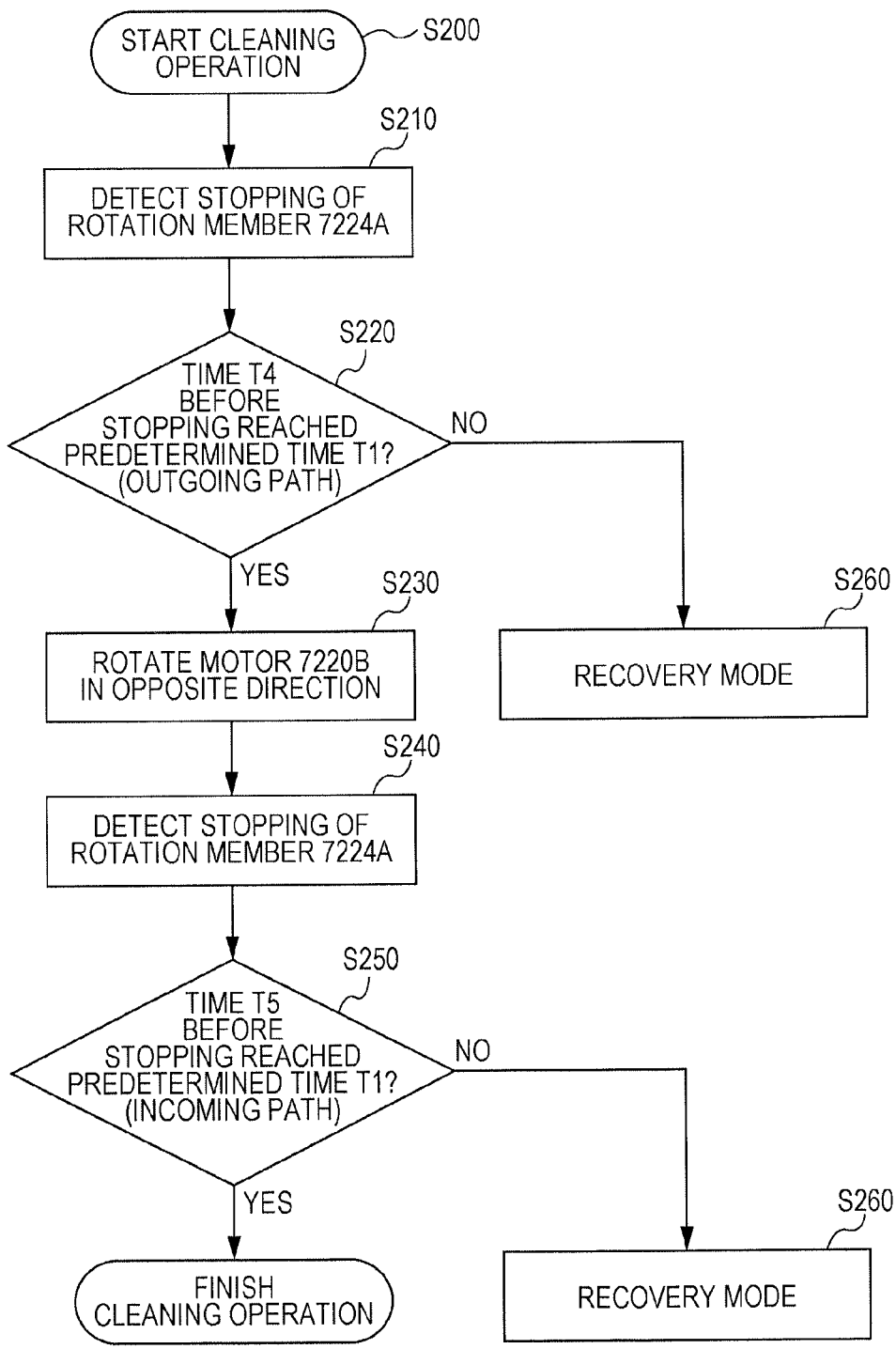
FIG. 13 is a flowchart of a second cleaning operation performed by the cleaning device according to the exemplary embodiment of the present invention.

Next, the charging device 72, the cleaning device 721, and the driving device 722 according to the second exemplary embodiment will be described with reference to FIG. 13, which is a flowchart of a second cleaning operation. The flowchart differs from that of the first exemplary embodiment in that the flowchart according to the second exemplary embodiment includes a recovery mode in step S260 or S270 (see FIG. 13), instead of step S160 or S170 of the first exemplary embodiment for issuing notification of abnormal stop of the cleaning member.

In step S220 or S250 according to the second exemplary embodiment, the controller 20 determines whether or not T4 (sec) or T5 (sec) stored in the second storage unit has reached T1 (sec). If it is determined that T4 (sec) or T5 (sec) has not reached T1 (sec), in step S260 or S270, the controller 20 sends to the cleaning device 721 a recovery mode command to normally operate the cleaning member 7211. Here, T4 (sec) is the time from when the cleaning member 7211 starts moving from the standby position to when the cleaning member 7211 stops before reaching the reversing position, and T5 (sec) is the time from when the cleaning member 7211 starts moving from the reversing position to when the cleaning member 7211 stops before reaching the standby position.

To be specific, the controller 20 temporarily drives the motor 7220B, which has been abnormal stopped, in a direction opposite to the direction in which the motor 7220B has been driven before the abnormal stop occurs, and then stops the motor 7220B. Thus, the cleaning member 7211 is temporarily released from the abnormally stopped state. Subsequently, the controller 20 drives the motor 7220B in the direction in which the motor 7220B has been driven before being abnormally stopped, and continues the cleaning operation.

Here, if the motor 7220B has been abnormally stopped before the cleaning member 7211 reaches the reversing position (if the determination in step S220 is "NO") and the cleaning operation is continued, the cleaning member 7211 will collide with the side wall 7216B at the reversing position and will be stopped again. In this case, the controller 20 drives the motor 7220B in a direction opposite to the direction in which the motor 7220B has been driven before the abnormal stop occurs. If the motor 7220B is stopped again before the time T1 (sec) elapses, the controller 20 recognizes that the cleaning member 7211 has collided with the side wall 7216A and returned to the standby position, and finishes the cleaning operation.

Thus, it is not necessary to manually perform maintenance. Other effects are the same as those of the first exemplary embodiment.

Third Exemplary Embodiment

Figure 14:
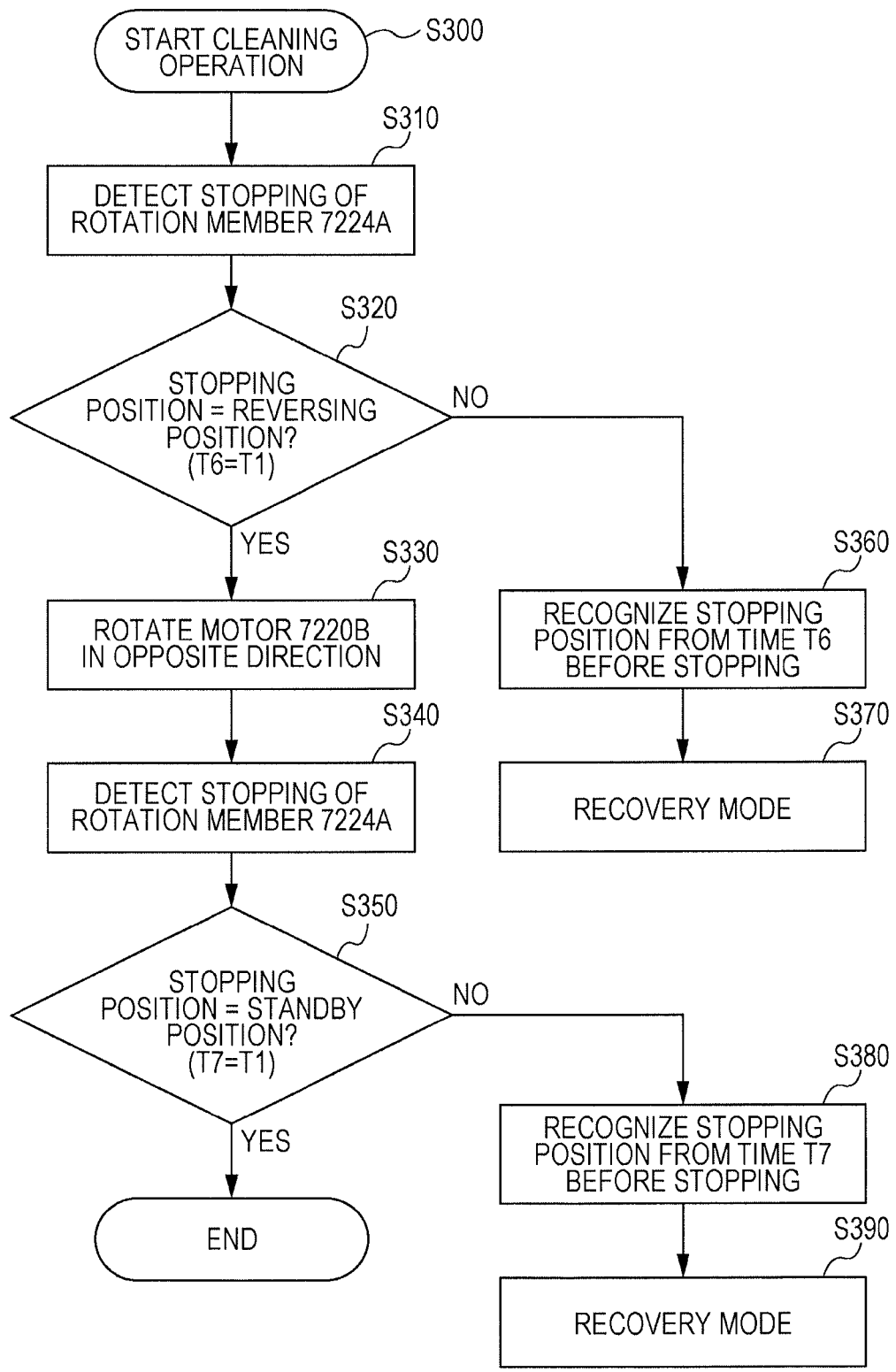
FIG. 14 is a flowchart of a third cleaning operation performed by the cleaning device according to the exemplary embodiment of the present invention.

Next, the charging device 72, the cleaning device 721, and the driving device 722 according to a third exemplary embodiment will be described with reference to FIG. 14, which is a flowchart of a third cleaning operation. The third exemplary embodiment differs from the second exemplary embodiment in that the third exemplary embodiment includes step S360 or S380 as illustrated in FIG. 13.

In step S320 or S350 according to the third exemplary embodiment, the controller 20 determines whether or not T6 (sec) or T7 (sec) stored in the second storage unit has reached T1 (sec). If it is determined that T6 (sec) or T7 (sec) has not reached T1 (sec), the controller 20 performs step S360 or S380, in which a stopping position is recognized from T6 (sec) or T7 (sec), and the process proceeds to step S370 or S390, in which the cleaning operation is resumed after abnormal stop. Here, T6 (sec) is the time from when the cleaning member 7211 starts moving from the standby position to when the cleaning member 7211 stops before reaching the reversing position, and T7 (sec) is the time from when the cleaning member 7211 starts moving from the reversing position to when the cleaning member 7211 stops before reaching the standby position.

In the third exemplary embodiment, the movement speed of the cleaning member 7211 is stored in the first storage unit beforehand. Here, "the movement speed of the cleaning member 7211" refers to the distance per unit time over which the cleaning member 7211 moves along the discharge wire 7200 in the direction of arrow Z or −Z. The movement speed depends on the rotation speed (rpm) of the motor 7220B of the driving device 722, the reduction ratio (or the increase ratio) of gears, the pitch of the helically formed thread 7210B of the feed screw 7210 in the axial direction.

If the motor 7220B is abnormally stopped before the time T1 (sec) elapses (if it is determined that the cleaning member 7211 is abnormally stopped before reaching the reversing position), in step S360, the controller 20 recognizes the stopping position of the cleaning member 7211 from the product of the movement speed of the cleaning member 7211 and the time T6 (sec), which is stored in the second storage unit. If the motor 7220B is temporarily stopped when the cleaning member 7211 reaches the reversing position and subsequently abnormally stopped (if is determined that the cleaning member 7211 is abnormally stopped after reversing direction at the reversing position), in step S380, the controller 20 recognizes the stopping position of the cleaning member 7211 on the basis of the time T7 (sec), which is stored in the second storage unit.

Subsequently, the controller 20 performs a recovery mode in step S370. To be specific, the controller 20 temporarily drives the motor 7220B, which has been abnormally stopped, in a direction opposite to the direction in which the motor 7220B has been driven before being abnormally stopped, and then stops the motor 7220B. Thus, the cleaning member 7211 is temporarily released from the abnormally stopped state. Subsequently, the controller 20 drives the motor 7220B in the direction in which the motor 7220B has been driven before being abnormally stopped, and continues the cleaning operation.

In the third exemplary embodiment, which includes step S360, the controller 20 recognizes the stopping position of the cleaning member 7211. That is, the controller 20 is capable of recognizing the time required to complete the cleaning operation. That is, the controller 20 is capable of setting a time T1' (sec) (<T1 (sec)) required by the cleaning member 7211 to reach the reversing position or the standby position in accordance with the stopping position, the controller 20 is capable of determining whether or not the cleaning member 7211 has reached the reversing position or the standby position in the predetermined time T1' (sec), which is shorter than the time T1 (sec). Therefore, the cleaning operation is completed in a time shorter than that of the second exemplary embodiment.

In another recovery mode, the controller 20 causes the cleaning member 7211, which has been abnormally stopped, to move in a direction opposite to the direction in which the cleaning member 7211 had been moving before being abnormally stopped until the cleaning member 7211 reaches the standby position. Subsequently, the controller 20 causes the cleaning device 721 to start a cleaning operation from the beginning. In this case, the controller 20 recognizes the time required by the cleaning member 7211 to move from the abnormally stopped position to the standby position.

In the case where cleaning operations are performed while interchanging the standby position and the reversing position every time a cleaning operation is performed, the controller 20, which recognizes the stopping position of the cleaning member 7211, selects one of the standby position and the reversing position that is nearer to the stopping position, and causes the cleaning member 7211 to move to the selected position. Thus, in a case of restarting a cleaning operation, the cleaning operation is started in a shorter time.

The present invention is not limited to the exemplary embodiments described above, and may be modified in various ways within the scope of the present invention. For example, in the first to third exemplary embodiments, in steps S120, S150, S220, S250, S320, and S350, the controller 20 determines whether or not the time T2, T3, T4, T5, and T6 stored in the second storage unit have reached the predetermined time T1 stored in the first storage unit. Alternatively, the controller 20 may determine whether or not the number of rotations detected by the rotation detector 7224E before the rotation is stopped has reached a predetermined rotation number of the rotation detector 7224E stored in the first storage unit.

In the third exemplary embodiment, the times T6 and T7 before the cleaning member 7211 is stopped are stored in the second storage unit, and the position at which the cleaning member 7211 has stopped is detected on the basis of the times T6 and T7. Alternatively, the number of rotations detected by the rotation detector 7224E before the rotation is stopped may be stored in the second storage unit, and the position at which the cleaning member 7211 has stopped may be detected on the basis of the number of rotations. Here, the term "the number of rotations detected by the rotation detector" refers to the total number of rotations of the rotation member 7224A from when the rotation detector 7224E started rotating to when the rotation member 7224A is stopped. This number may be obtained by counting the total number of ON/OFF pulse signals detected by the light detector.

In the exemplary embodiments described above, the cleaning device 721 cleans the discharge wire 7200, which is an example of a charging member, the housing 7202, or the grid 7204. However, the cleaning device 721 may be used to clean a corotron charging device, which does not include the grid 7204. The cleaning device 721 may be used to clean a charging roller that is disposed in contact with or not in contact with the photoconductor drum 62 and that charges the surface of the photoconductor drum 62 by causing corona discharge between the cleaning roller and the surface of the photoconductor drum 62. In the exemplary embodiments described above, the feed screw 7210 is used as an example of a movement member for moving the cleaning member 7211. Alternatively, a wire and a pulley may be used as the movement member.

In the exemplary embodiments described above, the charging device 72 is used to charge the photoconductor drum 62, which is an example of an image carrier. Alternatively, the charging device 72 may be used to charge the surface of a transfer medium or to eliminate charges on the surface of a photoconductor drum 62 after transfer has been finished.

The cleaning device may be used to clean not only the charging device but also a sealing glass of a scanning image forming unit, which is an example of an image forming unit for forming an image on the image carrier.

Figure 16B:
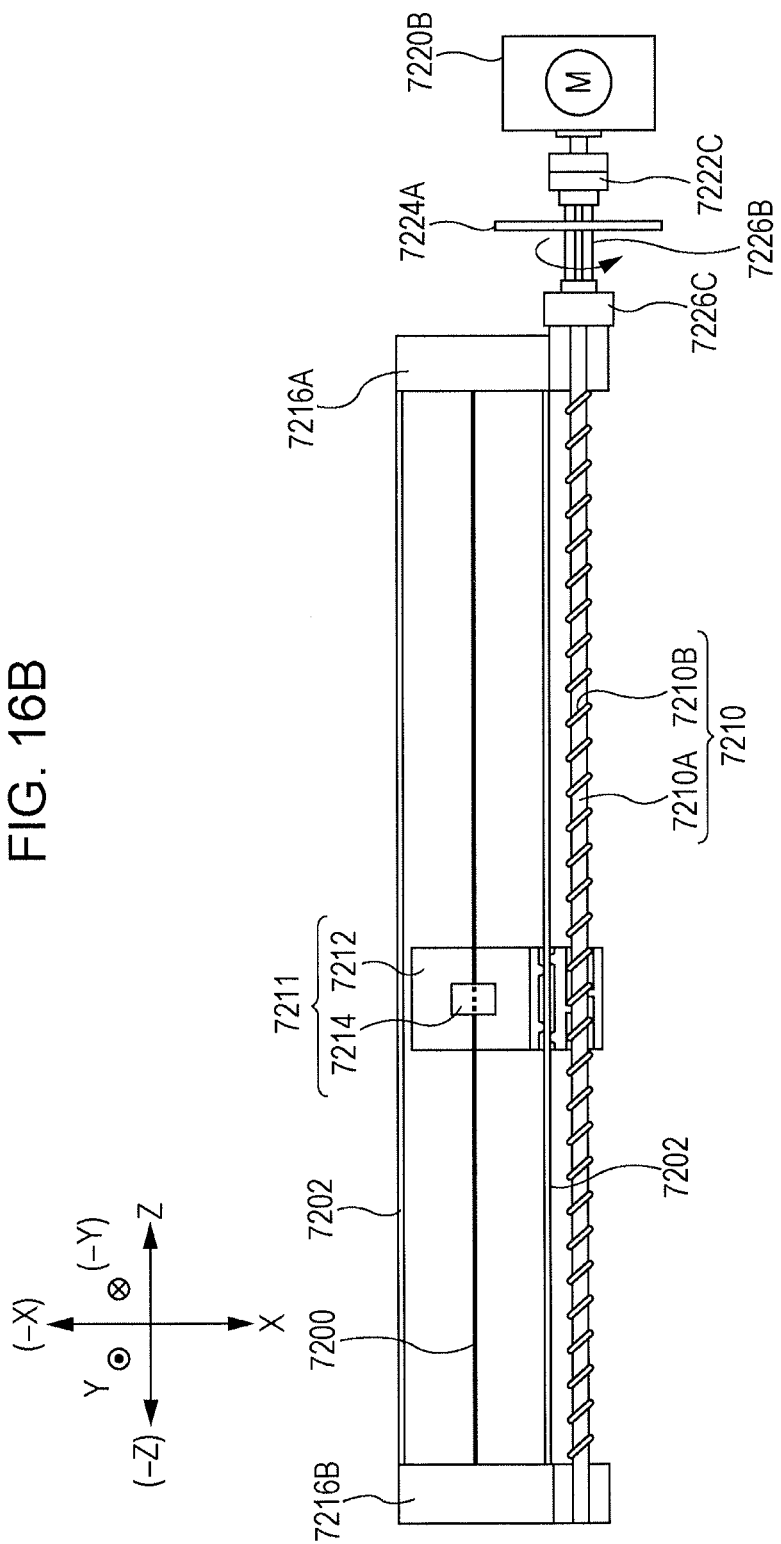
FIG. 16B is a schematic view of a charging device including a modification of the driving device according to the exemplary embodiment of the present invention.

The transmission unit of the driving device 722 may be modified as a driving device 722A (FIG. 16A) or a driving device 722B (FIG. 16B).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A driving device comprising:
a drive source that generates a force for moving a cleaning member that cleans an elongated member while moving in a longitudinal direction of the elongated member;
an overload limiter disposed between an input side and an output side of a transmission unit that transmits the force from the drive source to the cleaning member, the overload limiter interrupting transmission of the force if a magnitude of the force reaches a predetermined magnitude; and
a rotation detector disposed in the transmission unit on an output side of the overload limiter, the rotation detector detecting rotation caused by the force; and
wherein the rotation detector is disposed between the overload limiter and the cleaning member.

2. The driving device according to claim 1, further comprising:
a determination unit that determines, if the drive source starts generating the force from a state in which the cleaning member is disposed at a standby position and subsequently the rotation detector detects stopping of rotation, whether or not the cleaning member is located at a reversing position or the standby position on the basis of a time during which the rotation detector has been detecting rotation or the number of rotations detected by the rotation detector, the standby position being set at one end of the elongated member in the longitudinal direction and the reversing position being set at the other end of the elongated member in the longitudinal direction.

3. A cleaning device comprising:
the driving device according to claim 2;
the cleaning member that cleans the elongated member; and
a movement member connected to the output side of the transmission unit, the movement member moving the cleaning member by applying the force to the cleaning member.

4. The driving device according to claim 1, further comprising:
a detection unit that detects, if the drive source starts generating the force from a state in which the cleaning member is disposed at a standby position and subsequently the rotation detector detects stopping of rotation, a position at which the cleaning member has stopped on the basis of a time during which the rotation detector has been detecting rotation or the number of rotations detected by the rotation detector, the standby position being set at one end of the elongated member in the longitudinal direction.

5. A cleaning device comprising:
the driving device according to claim 4;
the cleaning member that cleans the elongated member; and
a movement member connected to the output side of the transmission unit, the movement member moving the cleaning member by applying the force to the cleaning member.

6. A cleaning device comprising:
the driving device according to claim 1;
the cleaning member that cleans the elongated member; and
a movement member connected to the output side of the transmission unit, the movement member moving the cleaning member by applying the force to the cleaning member.

7. A charging device comprising:
a charging member disposed along a rotation axis of an image carrier that rotates, the charging member charging the image carrier; and
the cleaning device according to claim 6 that cleans the charging device as the elongated member.

8. An assembly comprising:
the charging member;
the cleaning member; and
the movement member,
wherein the charging member, the cleaning member, and the movement member are integrally removable from an image forming apparatus body, and
wherein the assembly is assembled so that, when the assembly is attached to the image forming apparatus body, the movement member meshes with and is connected to an output side of a transmission unit disposed in the image forming apparatus body and the charging device according to claim 7 is formed.

9. The assembly according to claim 8, further comprising:
the image carrier to be charged by the charging member,
wherein the assembly is assembled so as to be integrally removable from the image forming apparatus body.

10. An image forming apparatus comprising:
the image carrier;
the charging device according to claim 7;
a latent image forming device that forms a latent image on a surface of the image carrier charged by the charging device;
a developing device that develops the latent image to form a toner image using a toner; and
a transfer device that transfers the toner image to a transfer member.

11. An image forming apparatus comprising:
the charging device including the assembly according to claim 9;
a latent image forming device that forms a latent image on a surface of the image carrier charged by the charging device;
a developing device that develops the latent image to form a toner image using a toner; and
a transfer device that transfers the toner image to a transfer member.

12. The image forming apparatus according to claim 10, further comprising:
a determination unit that determines, if the drive source starts generating the force from a state in which the cleaning member is disposed at a standby position and subsequently the rotation detector detects stopping of rotation, whether or not the cleaning member is located at a reversing position or the standby position on the basis of a time during which the rotation detector has been detecting rotation or the number of rotations detected by the rotation detector, the standby position being set at one end of the elongated member in the longitudinal direction and the reversing position being set at the other end of the elongated member in the longitudinal direction; and
a notification unit that issues notification of a determination result when the determination unit determines that the cleaning member is not located at the reversing position or the standby position.

* * * * *